United States Patent
Yuhara et al.

(10) Patent No.: US 9,502,704 B2
(45) Date of Patent: Nov. 22, 2016

(54) SEPARATOR CONVEYING DEVICE AND SEPARATOR CONVEYING METHOD

(75) Inventors: Hiroshi Yuhara, Yokohama (JP); Takahiro Yanagi, Kawasaki (JP); Manabu Yamashita, Kyoto (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 294 days.

(21) Appl. No.: 14/009,269

(22) PCT Filed: Apr. 6, 2012

(86) PCT No.: PCT/JP2012/059514
§ 371 (c)(1),
(2), (4) Date: Oct. 1, 2013

(87) PCT Pub. No.: WO2012/137922
PCT Pub. Date: Oct. 11, 2012

(65) Prior Publication Data
US 2014/0033883 A1    Feb. 6, 2014

(30) Foreign Application Priority Data

Apr. 7, 2011 (JP) ................................ 2011-085738
Apr. 7, 2011 (JP) ................................ 2011-085745

(51) Int. Cl.
*H01M 2/14* (2006.01)
*B65H 29/24* (2006.01)
(Continued)

(52) U.S. Cl.
CPC .............. *H01M 2/145* (2013.01); *B29C 65/18* (2013.01); *B29C 65/7847* (2013.01);
(Continued)

(58) Field of Classification Search
CPC ............ G01D 15/24; A24C 5/60; H01M 8/00; H01M 2/18; H01M 10/0404; H01M
(Continued)

(56) References Cited

U.S. PATENT DOCUMENTS

2012/0132697 A1    5/2012   Yano et al.
2012/0175406 A1    7/2012   Yano et al.

FOREIGN PATENT DOCUMENTS

CN          103250276 A     8/2013
EP          2 458 669 A2    5/2012
(Continued)

OTHER PUBLICATIONS

European Extended Search Report, Sep. 11, 2014, 9 pages.
Japanese Office Action, Jan. 27, 2015, 4 pages.

*Primary Examiner* — Kenneth E. Peterson
*Assistant Examiner* — Nhat Chieu Do
(74) *Attorney, Agent, or Firm* — Foley & Lardner LLP

(57) ABSTRACT

A separator conveying device includes a columnar rotor that holds a continuously supplied separator material on an outer circumferential surface thereof; a cutting unit that cuts the separator material while the separator material is held on the outer circumferential surface of the columnar rotor into a separator with a predetermined shape; and a control unit configured to control a suction force in a slip region. The separator cut out by the cutting unit is conveyed by rotating the columnar rotor while maintaining a state where the separator is held on the outer circumferential surface of the columnar rotor. The outer circumferential surface of the columnar rotor is formed into a suction region where the separator material or the separator is sucked and the slip region where the suction force is switched between sucking and fixing the separator material, and slipping the separator material while sucking the separator material.

12 Claims, 21 Drawing Sheets

(51) Int. Cl.
| | |
|---|---|
| *B65H 35/04* | (2006.01) |
| *B65H 37/04* | (2006.01) |
| *B65H 37/02* | (2006.01) |
| *B65H 37/06* | (2006.01) |
| *B29C 65/18* | (2006.01) |
| *B29C 65/78* | (2006.01) |
| *B29C 65/00* | (2006.01) |
| *B29C 65/80* | (2006.01) |
| *H01M 2/18* | (2006.01) |
| B29L 31/34 | (2006.01) |
| B29C 65/48 | (2006.01) |
| B29C 65/56 | (2006.01) |
| H01M 10/04 | (2006.01) |

(52) U.S. Cl.
CPC ........... *B29C 65/80* (2013.01); *B29C 66/1122* (2013.01); *B29C 66/21* (2013.01); *B29C 66/433* (2013.01); *B29C 66/81429* (2013.01); *B29C 66/83543* (2013.01); *B65H 29/241* (2013.01); *B65H 35/04* (2013.01); *B65H 37/02* (2013.01); *B65H 37/04* (2013.01); *B65H 37/06* (2013.01); *H01M 2/14* (2013.01); *H01M 2/18* (2013.01); *B29C 65/48* (2013.01); *B29C 65/56* (2013.01); *B29L 2031/3468* (2013.01); *H01M 10/0404* (2013.01); *Y10T 83/0448* (2015.04); *Y10T 83/2196* (2015.04)

(58) Field of Classification Search
CPC ............. 2/14;B32B 43/00; B29C 65/18; B29C 65/48; B29C 65/56; B29C 65/7847; B29C 66/1122; B29C 66/21; B29C 66/433; B29C 66/81429; B29C 66/83543; B29C 65/80; B65H 37/04; B65H 37/02; B65H 37/06; B65H 29/241; Y10T 83/0448; Y10T 83/2196
USPC ............ 83/331–349, 202–283, 100; 156/519
See application file for complete search history.

(56) References Cited

FOREIGN PATENT DOCUMENTS

| | | |
|---|---|---|
| JP | 63-299059 A | 12/1988 |
| JP | 9-306463 A | 11/1997 |
| JP | 2001-76743 A | 3/2001 |
| JP | 2002-193440 A | 7/2002 |
| JP | 2005-026194 A | 1/2005 |
| JP | 2005-050583 A | 2/2005 |
| JP | 2007-242506 A | 9/2007 |
| JP | 2007-329111 A | 12/2007 |
| JP | 2008-159352 A | 7/2008 |

FIG. 3
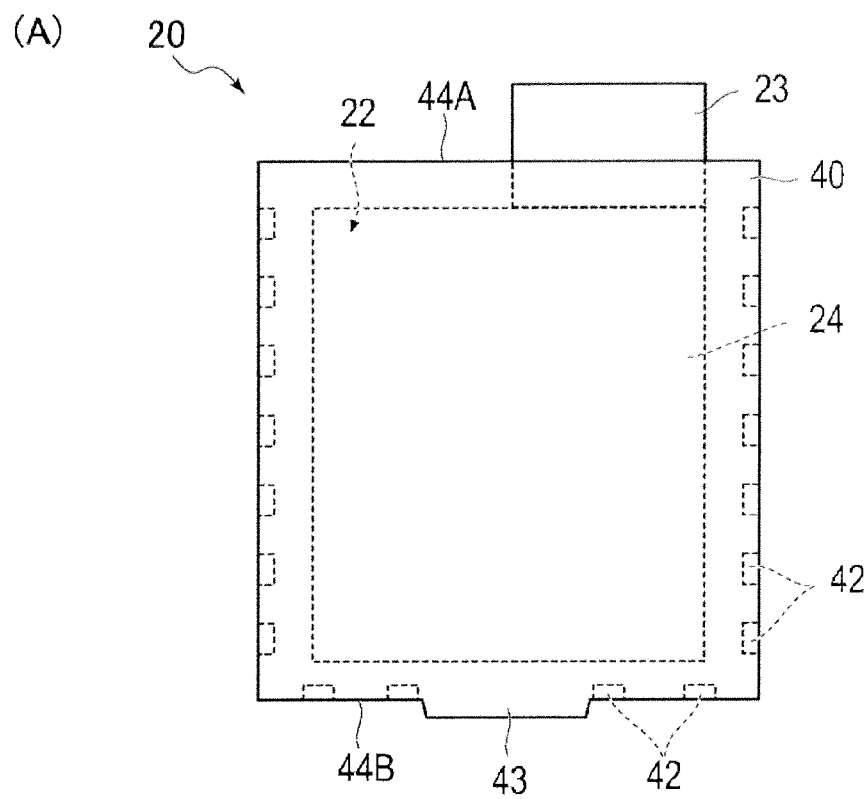
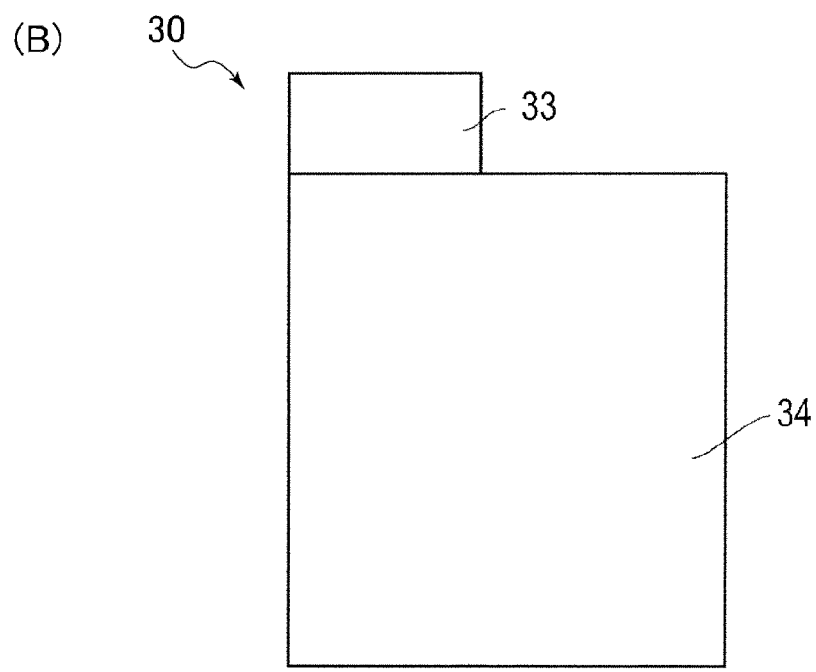

SEPARATOR CONVEYING DEVICE AND SEPARATOR CONVEYING METHOD

TECHNICAL FIELD

The present invention relates to a separator conveying device and a separator conveying method.

BACKGROUND ART

In recent years, in a variety of batteries such as an automotive battery, a solar cell and a battery for an electronic instrument, stacked batteries have been used. Each of the stacked batteries is configured in such a manner that a positive electrode, a negative electrode and separators are formed into a sheet shape, and that the positive electrode, the separator, the negative electrode and the separator are alternately stacked on one another in this order. Note that the positive electrode and the negative electrode are hereinafter referred to as electrodes in some case.

As devices for use in manufacturing the stacked battery as described above, a variety of devices has been proposed, and for example, devices described in Patent Literatures 1 and 2 are mentioned.

The device described in Patent Literature 1 first sucks and holds a sheet-like separator material, which is supplied from a roll, onto an outer circumferential surface of a prism-like suction drum capable of sucking the separator material concerned. Then, while being conveyed by rotating the suction drum, the separator material is cut by a heat cutter provided on a corner portion of the outer circumferential surface of the suction drum.

Moreover, the device described in Patent Literature 2 first sucks separator bands, which are continuously supplied, onto a receiving stage and a pressing plate, which are arranged so as to be vertically opposite to each other, thereafter, cuts the separator bands, and brings a state where the separators thus cut are held by the receiving stage and the pressing plate. Then, a positive electrode is mounted on the separator sucked onto such a lower receiving stage. Next, such an upper pressing plate is allowed to go down, and the separator sucked onto the pressing plate is put onto the positive electrode, and in this state, edges of the separators, which overlap each other on a periphery of the positive electrode, are thermally adhered to each other. Thereafter, surplus edges of the separators are cut, and a packaged positive electrode, in which the positive electrode is sandwiched by the separators formed into a bag shape, is fabricated. Then, the packaged positive electrode is taken out from between the receiving stage and the pressing plate. The packaged positive electrode is stacked on the negative electrode alternately therewith, whereby a battery element, in which the positive electrode, the separator, the negative electrode and the separator are alternately stacked on one another in this order, is obtained.

CITATION LIST

Patent Literature

Patent Literature 1: Japanese Patent Unexamined Publication No. 2005-50583
Patent Literature 2: Japanese Patent Unexamined Publication No. 2007-329111

SUMMARY OF INVENTION

However, in the device described in Patent Literature 1, since the suction drum is prism-like, tension acting on the separator material is always changed because the corner portion also rotates in response to rotation of the suction drum. Hence, a shape of the separators after the separators are cut becomes unstable, and processing precision in subsequent steps is lowered. Accordingly, for example, there is an apprehension that a wrinkle and the like may occur in the separators in the event of stacking, on the electrode, the separators after being cut.

Moreover, the device described in Patent Literature 2 cannot process the separator bands while delivering the separator bands concerned to the receiving stage and the pressing plate at arbitrary timing. Therefore, the separators cut out from the separator bands and held on the receiving stage and the pressing plate include portions to be removed after the thermal adhesion, and it is difficult to smoothly progress the processing.

The present invention has been made in consideration of such problems inherent in the conventional technology. Then, it is an object of the present invention to provide a separator conveying device and a separator conveying method, which are capable of stabilizing the shape of the separators, and are capable of enhancing the processing accuracy in the subsequent steps. It is another object of the present invention to provide a separator conveying device and a separator conveying method, which are capable of smoothly progressing the processing by arbitrarily adjusting the timing of supplying the separator material while conveying the separators thus cut out.

A separator conveying device according to a first aspect of the present invention includes: a columnar rotor that holds a separator material, which is continuously supplied thereto, on an outer circumferential surface thereof; and a cutting unit that cuts the separator material, which is held on the outer circumferential surface, in a state where the separator material is held on the outer circumferential surface of the columnar rotor, and cuts out a separator with a predetermined shape. Then, the separator cut out by the cutting unit is conveyed by rotating the columnar rotor while maintaining the state where the separator is held on the outer circumferential surface.

A separator conveying method according to a second aspect of the present invention includes: holding a separator material, which is continuously supplied thereto, on an outer circumferential surface of a columnar rotor, and in addition, cutting out a separator with a predetermined shape by cutting the separator material in a state where the separator material is held on the outer circumferential surface of the columnar rotor. Moreover, the separator conveying method includes conveying the cut out separator by rotating the columnar rotor while maintaining the state where the cut out separator is held on the outer circumferential surface of the columnar rotor.

BRIEF DESCRIPTION OF DRAWINGS

FIG. 3 is a plan view showing a packaged positive electrode, and a negative electrode.

DESCRIPTION OF EMBODIMENTS

Figure 1:
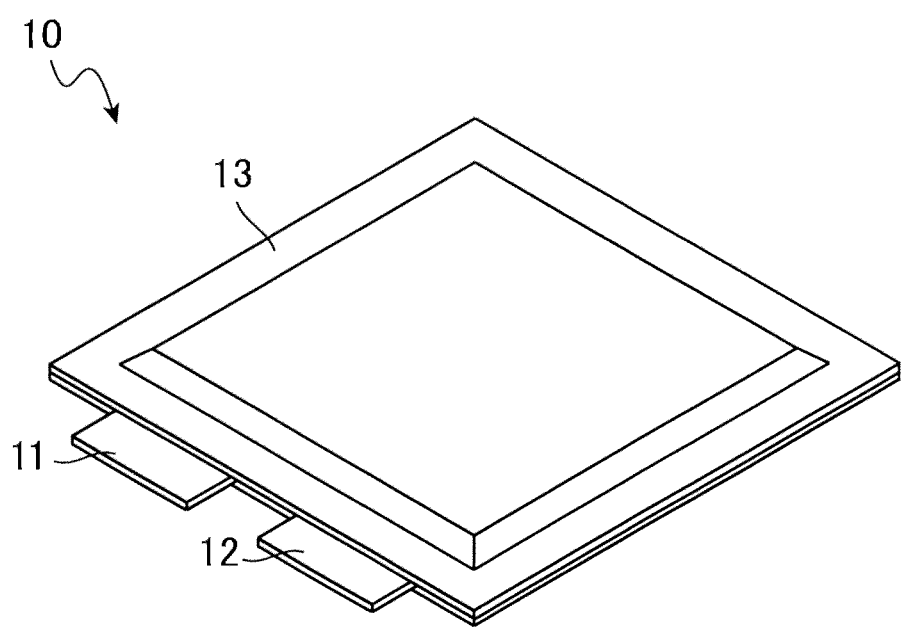
FIG. 1 is a perspective view showing an exterior appearance of a lithium ion secondary battery.

A description is made below of embodiments of the present invention with reference to the accompanying drawings. Note that dimensional ratios in the drawings are exaggerated for convenience of explanation, and are sometimes different from actual ratios.

The present invention relates to a separator conveying device and a separator conveying method, which are applied to a part of a manufacturing process of a battery. The separator conveying device according to an embodiment of the present invention composes a part of a stacking device for stacking separators on an electrode. Before describing the separator conveying device, a description is made of a structure of the battery and of the stacking device that assembles a power generation element thereof.

[Battery]

Figure 2:
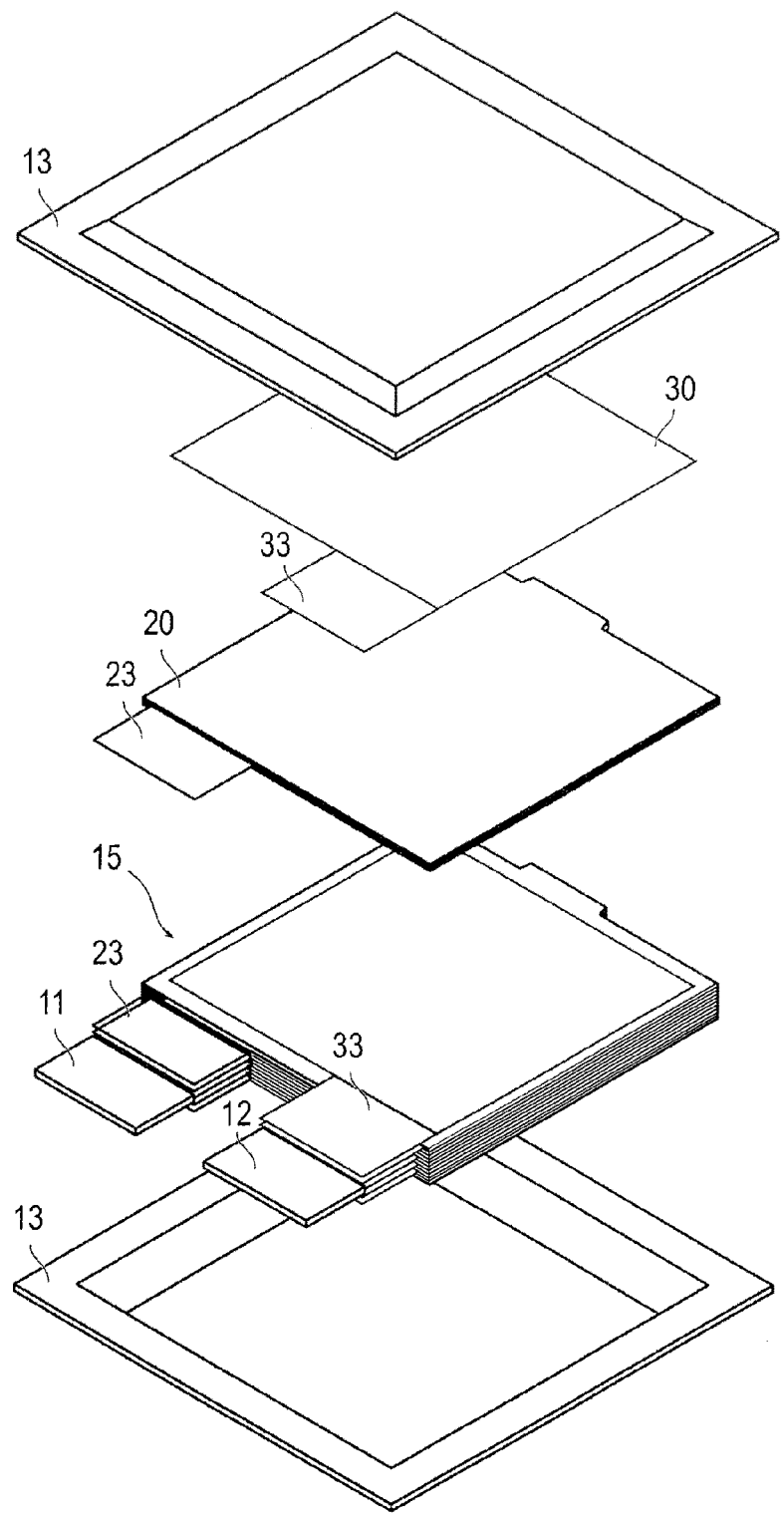
FIG. 2 is an exploded perspective view of the lithium ion secondary battery.

First, with reference to FIG. 1, a description is made of a lithium ion secondary battery (stacked battery) to be formed by the stacking device. FIG. 1 is a perspective view showing an exterior appearance of a lithium ion secondary battery, FIG. 2 is an exploded perspective view of the lithium ion secondary battery, and FIGS. 3A and 3B are plan views of a packaged positive electrode and a negative electrode.

As shown in FIG. 1, a lithium ion secondary battery 10 has a flat rectangular shape, and a positive electrode lead 11 and a negative electrode lead 12 are taken out from the same end portion of a covering material 13. Then, as shown in FIG. 2, in an inside of the covering material 13, a power generation element (battery element) 15 in which a charge/discharge reaction progresses is housed. The power generation element 15 is formed in such a manner that packaged positive electrodes 20 and negative electrodes 30 are alternately stacked on one another.

As shown in FIG. 3A, in each of the packaged positive electrodes 20, a rectangular positive electrode 22 is sandwiched by rectangular separators 40. In the positive electrode 22, positive electrode active material layers are formed on both surfaces of an extremely thin sheet-like positive electrode current collector (current collector foil). Two separators 40 are joined to each other at end portions thereof by joint portions 42, and are formed into a bag shape. In the separators 40, a positive electrode tab 23 of the positive electrode 22 is drawn out from a side 44A that is linearly formed, and further, on a side 44B opposite with the side 44A, an engagement portion 43 that partially protrudes is formed. The engagement portion 43 engages with the covering material 13 in an inside of the covering material 13, and thereby plays a role of fixing the power generation element 15 to the covering material 13. In the positive electrode 22, on portions thereof other than the positive electrode tab 23, such positive electrode active material layers 24 are formed.

As shown in FIG. 3B, each of the negative electrodes 30 is formed into a rectangular shape, in which negative electrode active material layers 34 are formed on both surfaces of an extremely thin-sheet like negative electrode current collector (current collector foil). In the negative electrode 30, on portions other than the negative electrode tab 33, the negative electrode active material layers 34 are formed.

Figure 4:
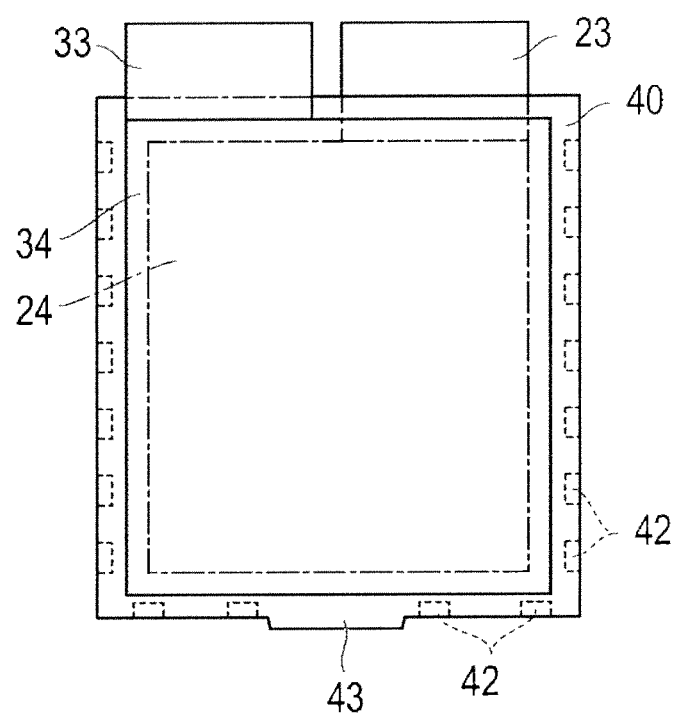
FIG. 4 is a plan view showing a state where the negative electrode is stacked on the packaged positive electrode.

When the negative electrode 30 is stacked on the packaged positive electrode 20, a shape as shown in FIG. 4 is formed. As shown in FIG. 4, when viewed from the above, the negative electrode active material layers 34 are formed larger by one size than the positive electrode active material layers 24 of the positive electrode 20.

Note that a method itself for manufacturing the lithium ion secondary battery by alternately stacking the packaged positive electrodes 20 and the negative electrodes 30 to each other is a general manufacturing method of the lithium ion secondary battery, and accordingly, a detailed description thereof is omitted.

[Stacking Device]

Next, while referring to the drawings, a description is made of a stacking device including a separator conveying device according to the embodiment of the present invention.

Figure 5:
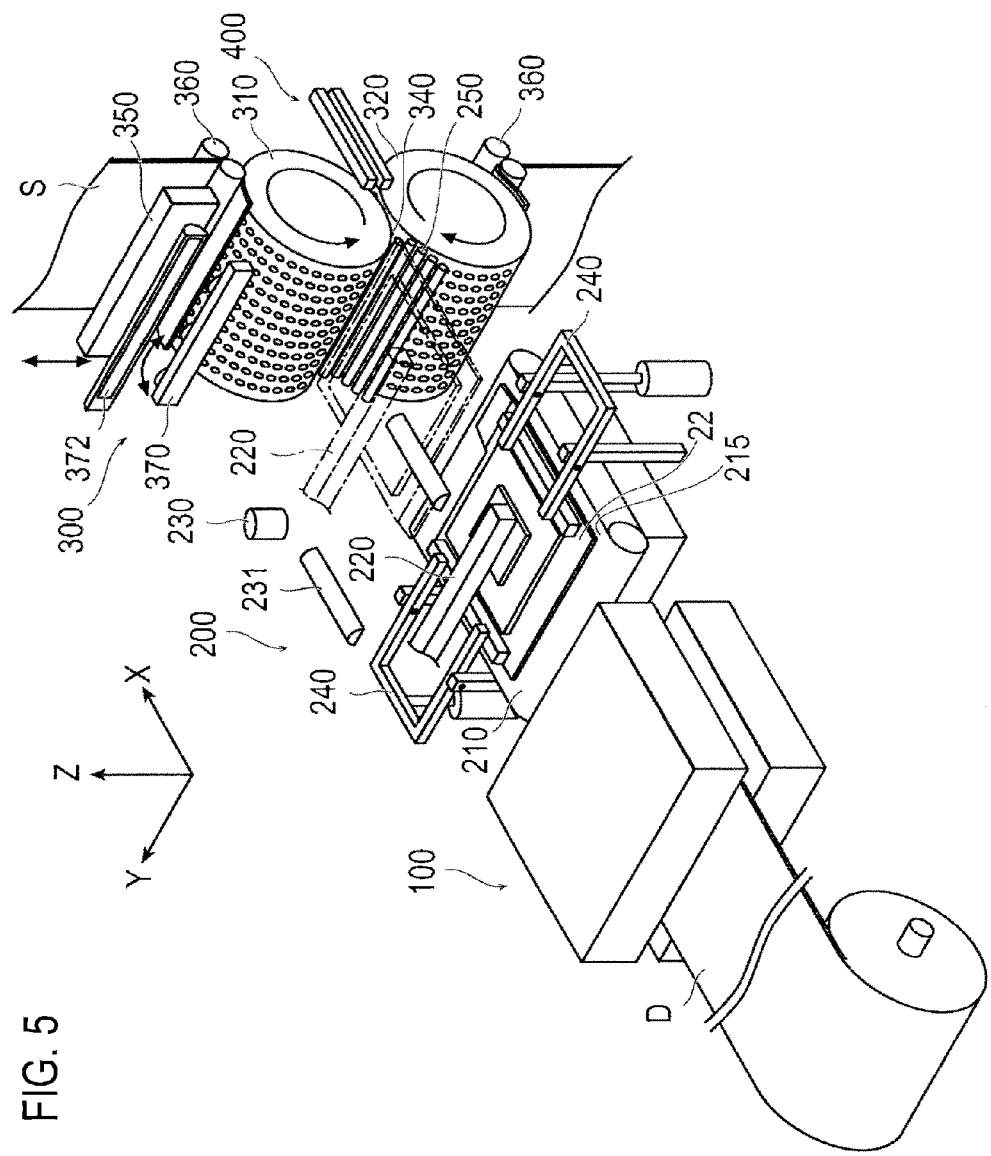
FIG. 5 is a schematic perspective view showing a stacking device.
Figure 6:
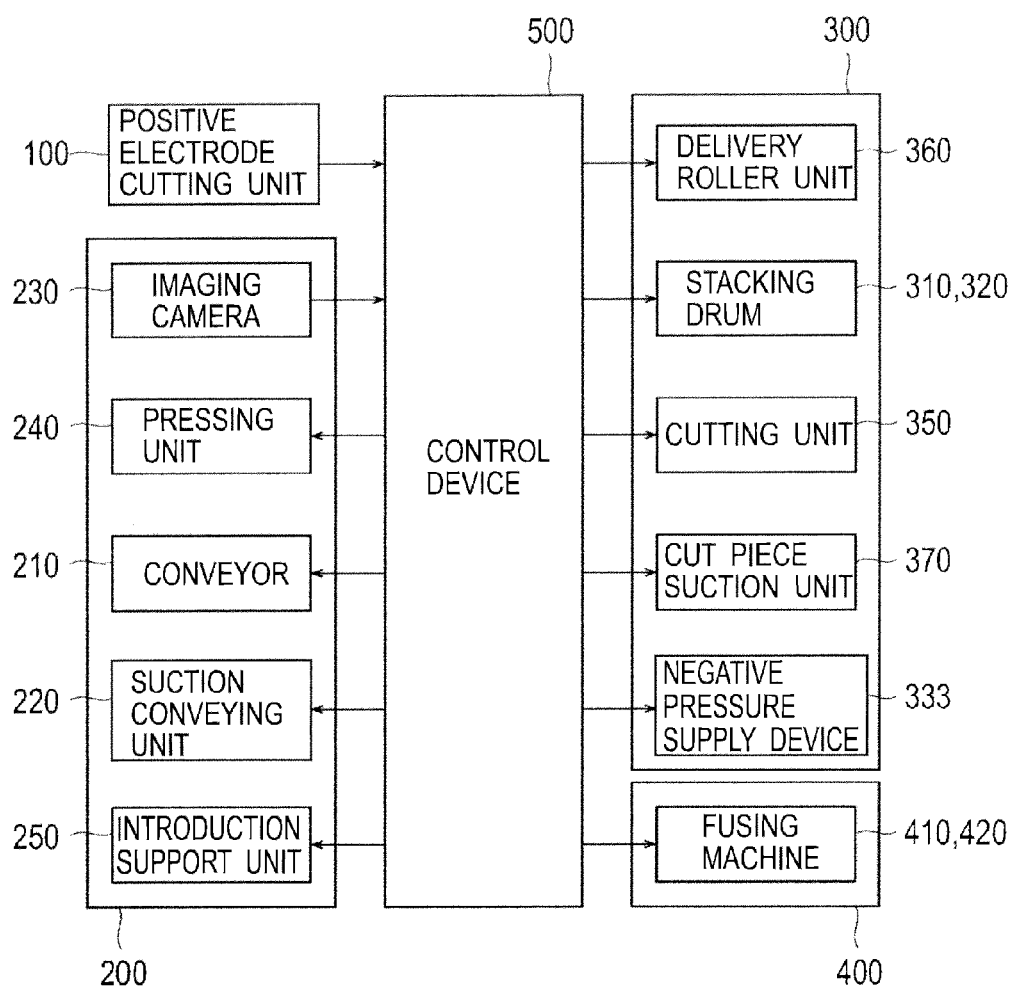
FIG. 6 is a diagram showing an electrical configuration of the stacking device.

As shown in FIG. 5 and FIG. 6, this stacking device includes: a positive electrode cutting unit 100 that cuts out the positive electrode 22 from a sheet material D for the positive electrode; and an electrode conveying unit 200 that conveys the positive electrode 22 thus cut out. Moreover, the stacking device includes: a separator conveying device 300 provided on a downstream side of the electrode conveying unit 200 in a conveying direction; a fusing unit 400 provided on both sides of the separator conveying device 300; and a control device 500 (control unit) that controls the whole of the device in a centralized manner. In this embodiment, the description is made on the assumption that a direction where the positive electrode 22 is conveyed is a conveying direction X, that a direction perpendicular to a surface of the positive electrode 22 is a vertical direction Z, and a direction perpendicular to the vertical direction Z and the conveying direction X is a width direction Y.

The positive electrode cutting unit 100 is a unit, which cuts the sheet material D for the positive electrode, which is wound up in a roll shape, into a predetermined shape by punching processing and the like, and thereby cuts out the positive electrode 22 (sheet member) with a predetermined shape. The positive electrode 22 thus cut out here is rectangular, and has the positive electrode tab 23.

Figure 7:
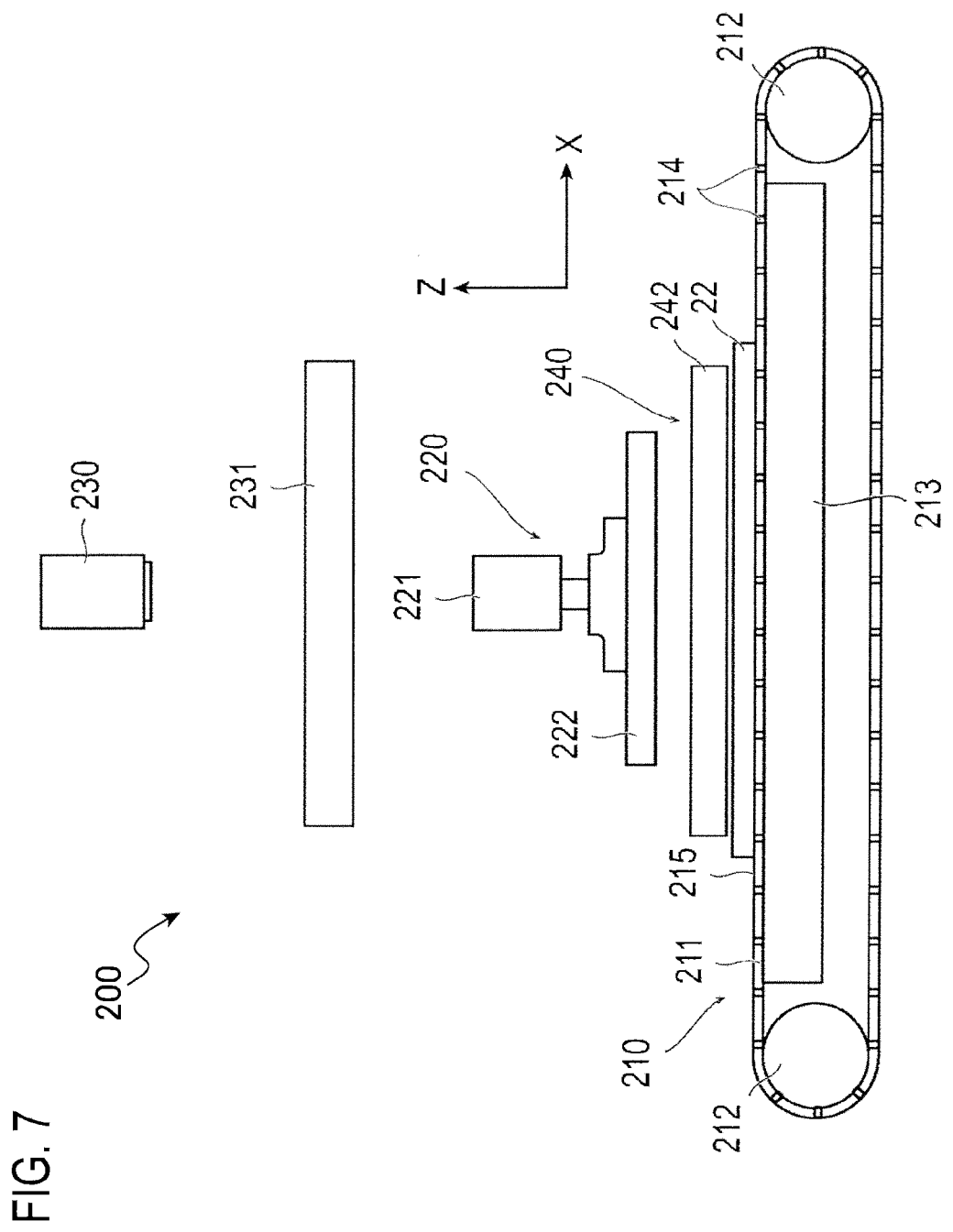
FIG. 7 is a side view showing an electrode conveying unit of the stacking device.
Figure 8:
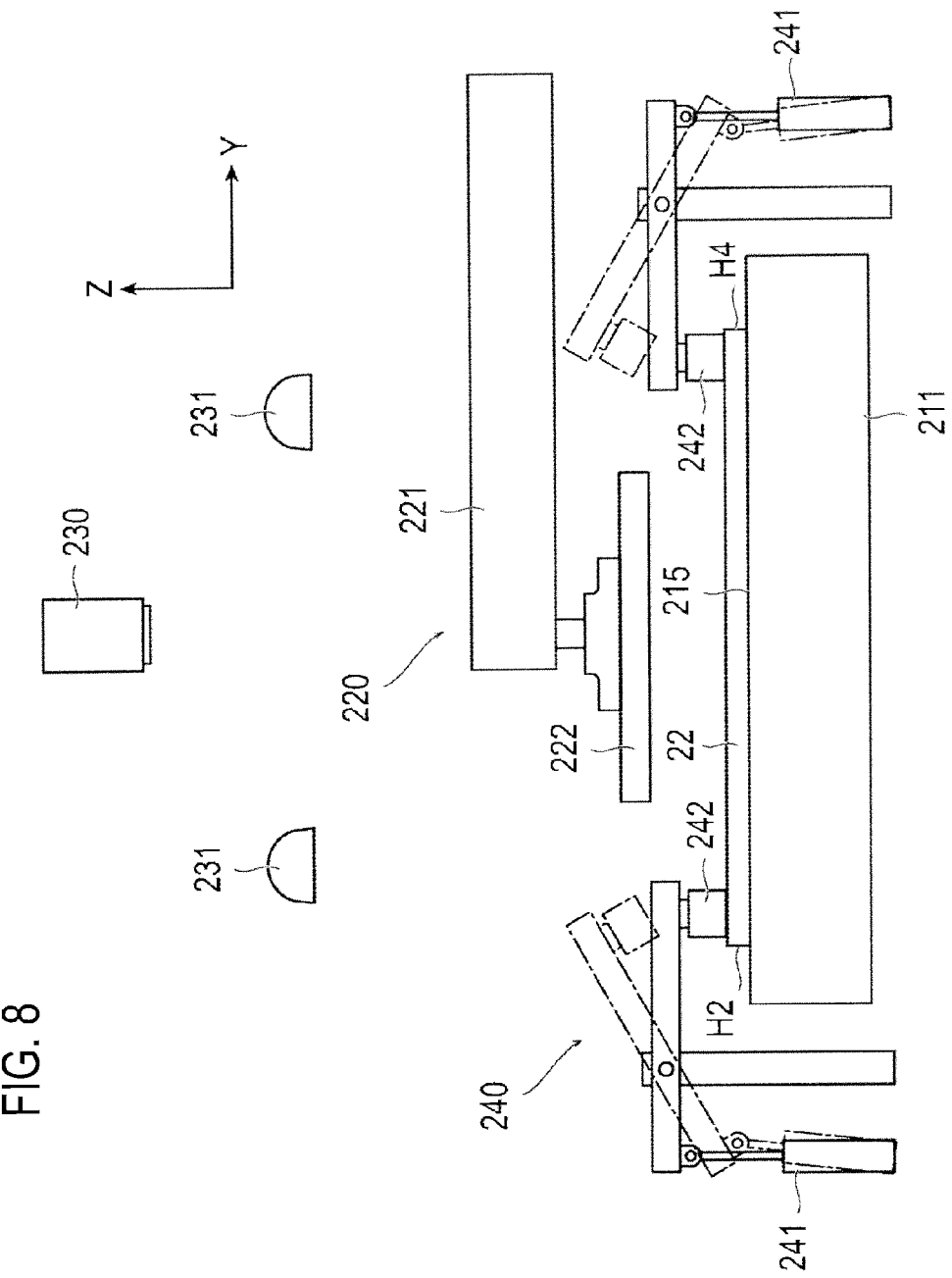
FIG. 8 is a front view showing the electrode conveying unit of the stacking device.
Figure 9:
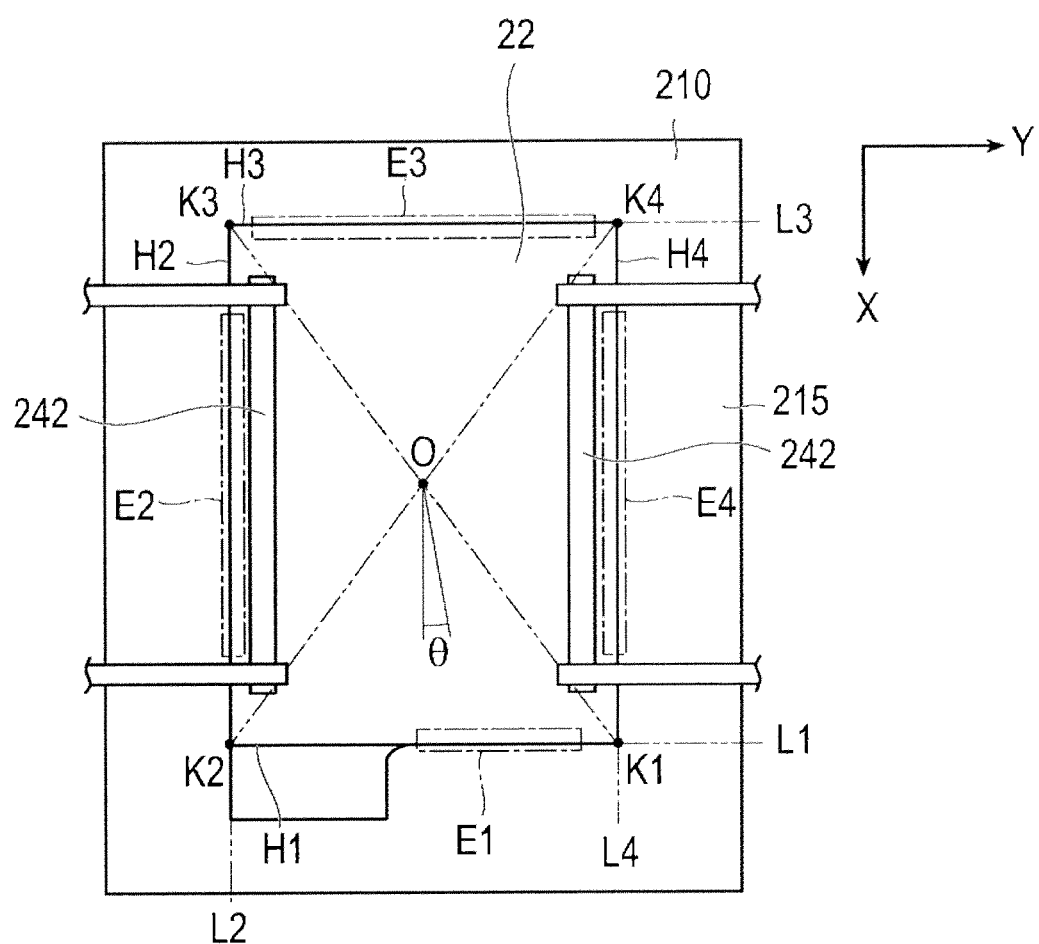
FIG. 9 is a plan view showing the electrode conveying unit of the stacking device.

As shown in FIGS. 7 to 9, the electrode conveying unit 200 includes: a conveyor 210; and a suction conveying unit 220. The conveyor 210 conveys the positive electrode 22 cut out in the positive electrode cutting unit 100. The suction conveying unit 220 sucks the positive electrode 22 on the conveyor 210, and conveys the positive electrode 22 to the separator conveying device 300. Above the conveyor 210, there are provided an imaging camera 230 (position detection unit) and a lighting fixture 231.

The conveyor 210 includes: a suction belt 211, which is formed endlessly and has air permeability; and two rotation shafts 212, which are arranged in line in the conveying direction and rotatably hold the suction belt 211. Moreover, the conveyor 210 includes a negative pressure generation unit 213 arranged in an inside of the suction belt 211.

A plurality of air vacuum holes 214 is formed in the suction belt 211. Then, air is sucked by the negative pressure generation unit 213 through the air vacuum holes 214, whereby it is made possible to hold the positive electrode 22, which is thin and difficult to convey, on a flat installation surface 215 (reference surface) on the conveyor 210, and to convey the positive electrode 22 concerned. The installation surface 215 of the suction belt 211 has a color tone by which it is easy for the imaging camera 230 to recognize a boundary thereof with the positive electrode 210, and a color of the installation surface 215 is white in this embodiment.

Note that, in this embodiment, the conveyor 210 is applied as a device including the flat installation surface 215 capable of installing thereon the positive electrode 22 in a substantially horizontal state. However, other devices may be used as long as the flat installation surface is provided in each thereof.

As shown in FIG. 5 and FIG. 8, on both sides of the conveyor 210, a pressing unit 240 is provided, which presses and holds side portions of the positive electrode 22 on the suction belt 211. The pressing unit 240 includes dampers 242, which come close to or are spaced apart from the installation surface 215 (reference surface) on the suction belt 211 by actuators 241 controlled by the control device 500. The clampers 242 are members which correct distortion of the positive electrode 22 by pressing the positive electrode 22 on the installation surface 215. In particular, the positive electrode 22 cut out from the sheet material D wound up in the roll shape is prone to be rounded since curl is left therein. Moreover, each of the positive electrodes 22, the negative electrodes 30 and the separators 40 is a material with an extremely thin foil shape, and is extremely prone to be deformed in such a large battery as an automotive battery. Note that, though the suction belt 211 is a member that sucks and holds the member brought into contact with the installation surface 215; however, in usual, does not have suction force enough to attract a region apart from the installation surface 215. Accordingly, the positive electrode 22 is thrust against the installation surface 215 by the dampers 242, whereby such deformation of the positive electrode 22 is corrected. In such a way, the imaging camera 230 can be allowed to grasp the position of the positive electrode 22 with high precision, and in addition, a suction position by the suction conveying unit 220 can also be set with high precision. As a result, processing precision in subsequent steps is enhanced.

Then, as shown in FIG. 9, the clampers 242 are formed so as to be capable of pressing long regions which go along two sides H2 and H4 (edges) along the conveying direction of the positive electrode 22 on the suction belt 211. In such a way, the suction position of the positive electrode 22 by the suction conveying unit 220 can be ensured between the dampers 242. Moreover, the dampers 242 can press an inside of edges of four sides H1 to H4 (edges) of the positive electrode 22, that is, a center side of the positive electrode 22 so that the four sides H1 to H4 can be imaged by the imaging camera 230. Note that the clampers 242 are formed of transparent members so that the positive electrode 22 pressed thereby can be imaged through the clampers 242. As the transparent members, for example, acrylic resin, glass and the like can be applied. However, the material of the dampers 242 is not particularly limited, and can be appropriately set in response to a frequency of the lighting fixture 231 and imaging characteristics of the imaging camera 230.

The suction conveying unit 220 includes: a device body 221, which is connected to a drive device (not shown) and is movable; and a suction head 222, which is provided on a lower portion of the device body 221 and exerts suction force by being connected to a negative pressure supply source (not shown). The suction head 222 is movable three-dimensionally in the vertical direction Z, the conveying direction X and the width direction. Y in accordance with an operation of the drive device, and further, is made rotatable along a horizontal plane.

The imaging camera 230 provided above the conveyor 210 is a unit that images the positive electrode 22, which is conveyed by the conveyor 210, under light, which is irradiated by the lighting fixture 231, after the positive electrode 22 is pressed and held by the damper 242. The imaging camera 230 transmits, to the control device 500, a signal that is based on an image of the positive electrode 22 imaged in the event where the positive electrode 22 is conveyed to a predetermined position and stopped there. The control device 500 that has received such a predetermined signal calculates position information, which is the position and state of the positive electrode 22, from the signal concerned, and controls movement of the drive device of the suet ion conveying unit 220 based a result of the calculated position information. Then, the suction conveying unit 220 appropriately corrects the position and attitude of the positive electrode 22, and conveys the positive electrode 22 concerned to a gap 340 (refer to FIG. 5) of the separator conveying device 300 to be described later.

Specifically, the control device 500 stops the conveyor 210 at the predetermined position, and then from the image imaged by the imaging camera 230, detects edges of side areas E1 to E4 corresponding to the four sides of the positive electrode 22 shown in FIG. 9. The edges concerned can be detected from a difference in color tone between the suction belt 211 and the positive electrode 22. From this detection result, the control device 500 calculates approximate straight lines L1 to L4 of the four sides by using the least-squares method. Next, the control device 500 calculates four corner portions K1 to K4, which are intersections between the approximate straight lines L1 to L4 of the four sides, and calculates an average value of the four corner portions K1 to K4, and defines this average value as coordinates of an electrode center point O. Note that the coordinates of the electrode center point O are represented by coordinates in the conveying direction X and the width direction Y. Then, from either one of the approximate straight lines L2 and L4 of the two sides H2 and H4, which go along the conveying direction of the positive electrode 22, or from an average value of both thereof, the control device 500 calculates an inclination angle θ of the positive electrode 22 on the horizontal plane (reference surface). Thereafter, from the coordinates of the electrode center point O and from the inclination angle θ, the control device 500 calculates correction amounts of the position and inclination of the positive electrode 22 on the horizontal plane with respect to a regular position thereof. Then, the control device 500 controls the drive device of the suction conveying unit 220 (position correction unit) to perform correction for this correction amounts. Moreover, the suction conveying unit 220 conveys the positive electrode 22 to the gap 340 of the separator conveying device 300 while correcting the position and attitude of the positive electrode 22.

Note that, in this embodiment, the position and state of the positive electrode 22 is recognized by the imaging camera 230. However, other sensors may also be used, and for example, the position of the positive electrode 22 can also be recognized by a contact sensor that senses a tip end of the positive electrode 22, and the like.

In a state where the positive electrode 22 is conveyed to the predetermined position of the conveyor 210, and the shape of the positive electrode 22 is corrected by pressing the side portions of the positive electrode 22 by the clampers 242, the suction conveying unit 220 goes down vertically, and sucks and holds the positive electrode 22 by the suction head 222. Then, after releasing such restriction of the positive electrode 22 by the dampers 242, the suction conveying unit 220 goes up while maintaining the substantially horizontal state of the positive electrode 22. Thereafter, the suction conveying unit 220 appropriately corrects the position and attitude of the positive electrode 22 in response to the calculated correction amounts, and conveys the positive electrode 22 to the gap 340 of the separator conveying device 300.

Figure 10:
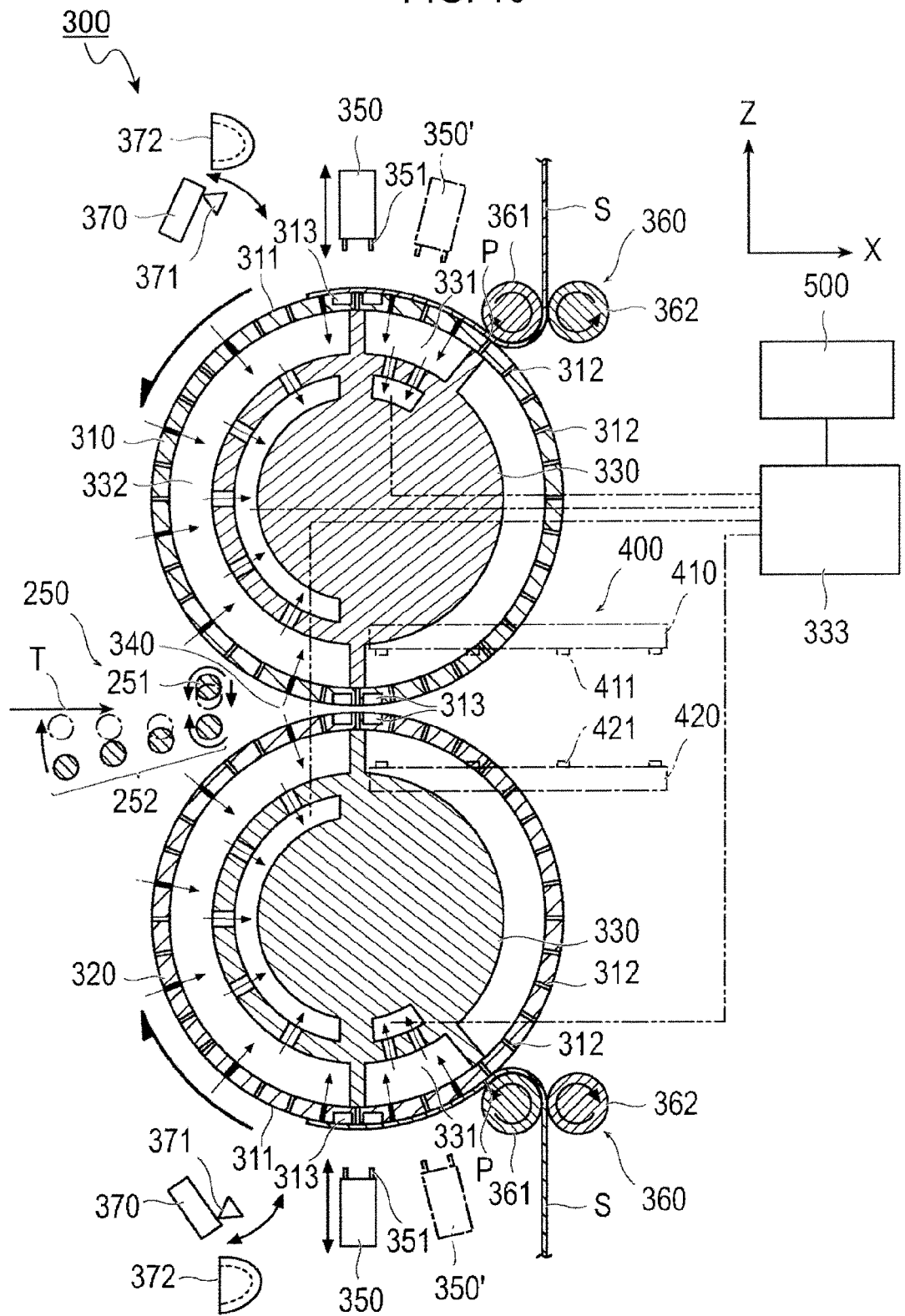
FIG. 10 is a schematic cross-sectional view showing a separator conveying device provided in the stacking device.

In the vicinity of the gap 340 of the separator conveying device 300, as shown in FIG. 10, there is provided an introduction support unit 250, which is provided so as to sandwich upper and lower portions of the gap 340 thereby, and assists introduction of the positive electrode 22 into the separator conveying device 300. The introduction support unit 250 is a unit, which is composed of a plurality of roller groups, supports the positive electrode 22 conveyed by the suction conveying unit 220, and in addition, sends out the positive electrode 22 to the gap 340 of the separator conveying device 300.

The introduction support unit 250 includes: an upper introduction support portion 251 composed of one roller; and a lower introduction support portion 252 composed of a plurality of rollers. The upper introduction support portion 251 is movable in the vertical direction Z, and can turn from an "opened state" of moving upward to a "closed state" of going down therefrom and sandwiching the positive electrode 22 with a roller on a most downstream side in the conveying direction in the lower introduction support portion 252. Moreover, the upper introduction support portion 251 drives so as to rotate, and can thereby send out, to the gap 340, the positive electrode 22 sandwiched thereby.

Figure 14:
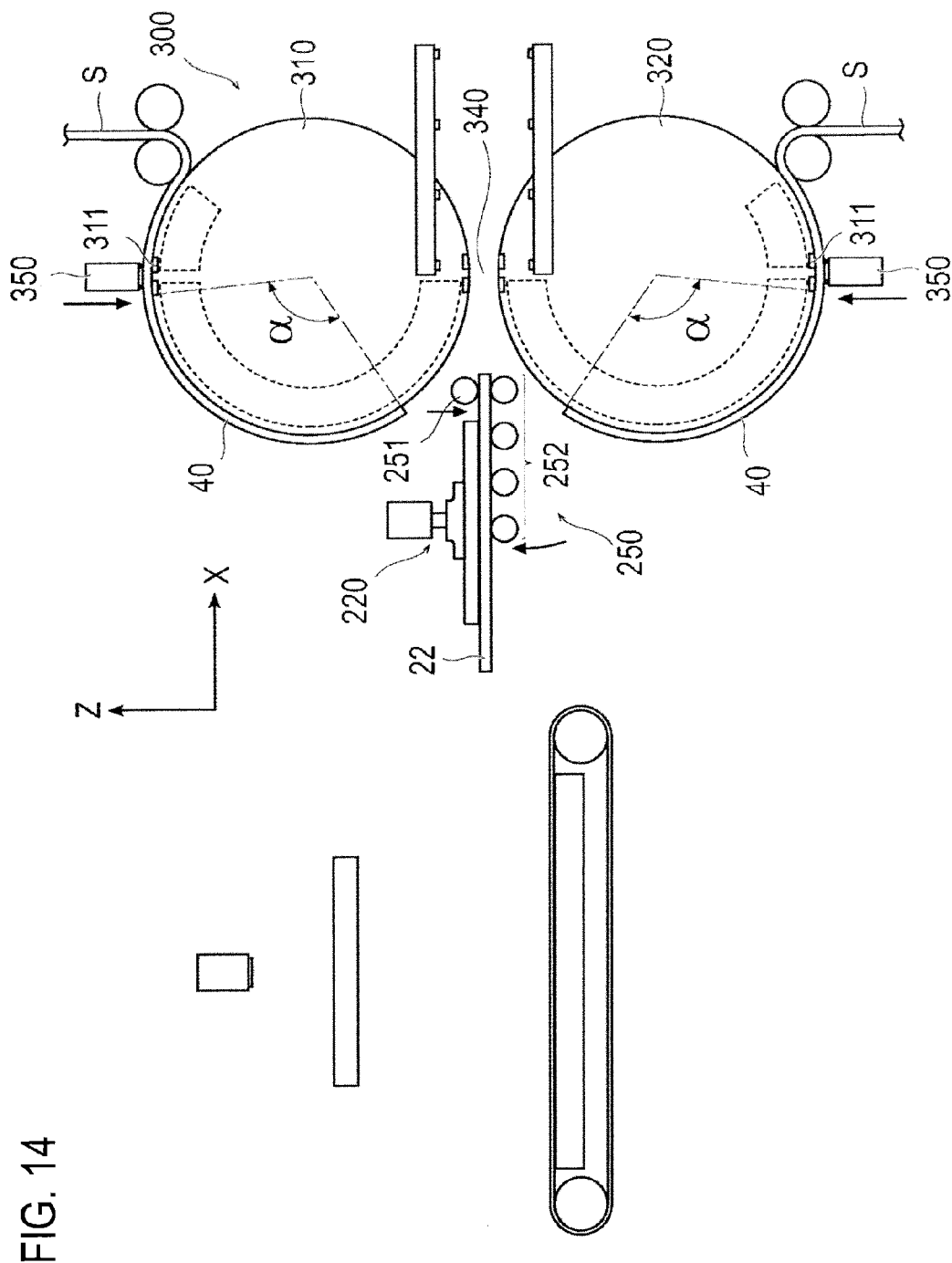
FIG. 14 is a fourth explanatory view showing the process by the stacking device including the separator conveying device.

The lower introduction support portion 252 turns from an "opened state" where upstream-side rollers thereof in the conveying direction go down obliquely to a "closed state" as a result that the upstream-side rollers in the conveying direction go up and become substantially horizontal in the event where the positive electrode 22 is delivered from the suction conveying unit 220. In such a way, as shown in FIG. 14, the lower introduction support portion 252 supports the positive electrode 22 so as to be conveyable. Such a most downstream-side roller in the conveying direction in the lower introduction support portion 252, the roller making a pair with the roller of the upper introduction support portion 251, is made capable of driving so as to rotate. Therefore, the most downstream-side roller rotates in a state of sandwiching the positive electrode 22 with the upper introduction support portion 251, whereby the positive electrode 22 sandwiched thereby can be sent out to the gap 340.

Hence, when the positive electrode 22 is conveyed by the suction conveying unit 220, the upper introduction support portion 251 is allowed to go down, and is allowed to sandwich the tip end of the positive electrode 22 with the lower introduction support portion 252. Moreover, the rollers of the lower introduction support portion 252 are allowed to go up to be set in the substantially horizontal state, and then support a lower surface of the positive electrode 22. Thereafter, the positive electrode 22 is released from the suction head 222 of the suction conveying unit 220, and the positive electrode 22 is sequentially sent into the gap 340 of the separator conveying device 300 by the rotation of the introduction support unit 250.

The separator conveying device 300 is a unit that stacks the separators 40 on the positive electrode 22, which is conveyed by the suction conveying unit 220, while cutting out the separators 40 from a sheet-like separator material S. The separator conveying device 300 includes a pair of an upper stacking drum 310 (columnar rotor) and a lower stacking drum 320 (columnar rotor), which are formed into a columnar shape.

In the pair of upper and lower stacking drums 310 and 320, rotation axes thereof are perpendicular to the conveying direction X. Moreover, the stacking drums 310 and 320 are arranged in parallel to each other so that outer circumferential surfaces 311 thereof can be opposite to each other at such a predetermined gap 340, and have structures symmetric to each other with respect to the horizontal plane.

On the outer circumferential surfaces 311 of the respective stacking drums 310 and 320, suction portions capable of sucking the separators 40 are formed. Moreover, in insides of the stacking drums 310 and 320, inside structure portions 330 provided so as not to rotate are provided. A width (length in a rotation axis direction) of the stacking drums 310 and 320 is set to an extent where both edges of the separator material S protrude from both ends of the stacking drums 310 and 320.

The upper and lower stacking drums 310 and 320 are arranged through the gap 340. Then, at the gap 340, the stacking drums 310 and 320 rotate toward the downstream side in the conveying direction X. That is to say, the stacking drum 310 located on the upper side rotates counterclockwise on a sheet surface of FIG. 10, and thereby conveys the separator 40, which is sucked onto the outer circumferential surface 311, to the gap 340. Moreover, the stacking drum 320 located on the lower side rotates clockwise on the sheet surface of FIG. 10, and thereby conveys the separator 40, which is sucked onto the outer circumferential surface 311, to the gap 340. Note that the upper and lower stacking drums 310 and 320 are driven by drive motors (not shown) in which rotation is controlled by the control device 500.

In the stacking drums 310 and 320, on the outer circumferential surfaces 311, a countless number of air vent holes 312 are formed. Moreover, in the outer circumferential surfaces 311, on partial portions thereof in the circumferential direction, recessed portions 313 (receiving portions), which are capable of receiving separator cutters 351 (cutting blades) provided on cutting units 350 to be described later, are formed. The recessed portions 313 are formed at two spots of each of the stacking drums 310 and 320, the spots being spaced apart from each other by 180 degrees. Note that the reason why the recessed portions 313 are provided at two spots in the circumferential direction is in order to cut out two pieces of the separators 40 every time when each of the stacking drums 310 and 320 makes one rotation. However, the number of recessed portions 313 in the circumferential direction can be changed in response to the number of separators 40 to be cut out during one rotation of each of the stacking drums 310 and 320.

Figure 15:
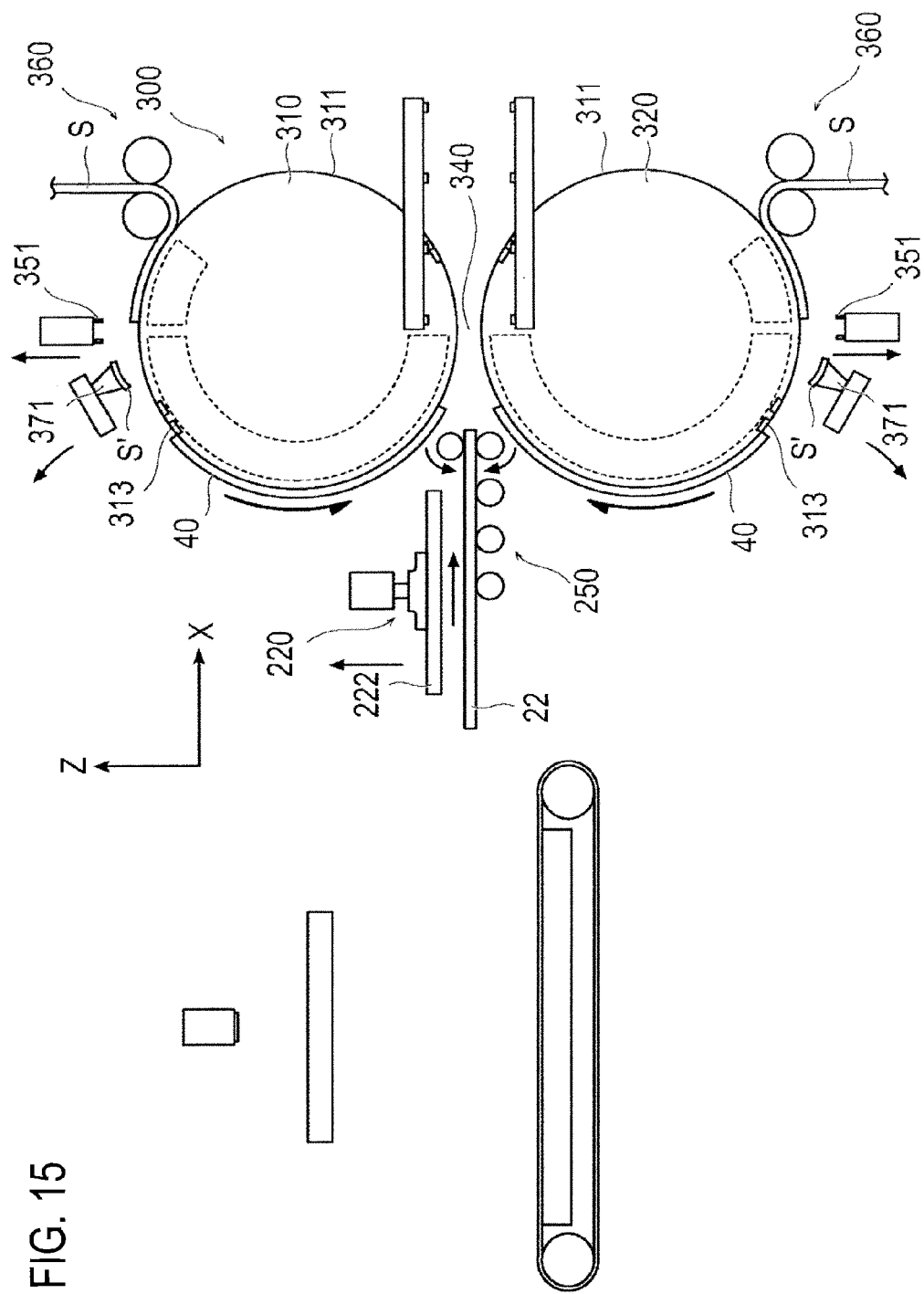
FIG. 15 is a fifth explanatory view showing the process by the stacking device including the separator conveying device.

Then, on the peripheries of the respective stacking drums 310 and 320, delivery roller units 360 (locking mechanisms), which supply or restrict the sheet-like separator material S, are provided near the outer circumferential surfaces 311. Moreover, the cutting units 350, which cut the separator material S on the outer circumferential surfaces 311 of the stacking drums 310 and 320, are provided. Furthermore, as shown in FIG. 15, cut piece suction units 370 for collecting unnecessary cut pieces S' generated by the cutting by the cutting units 350 are provided.

Specifically, obliquely above and obliquely below on the downstream side in the conveying direction of the separator conveying device 300, the small-sized delivery roller units 360 formed into a columnar shape are provided.

In the delivery roller units 360, obliquely above and obliquely below on the downstream side in the conveying direction of the separator conveying device 300, pairs of delivery rollers 361 and 362 are provided. The delivery rollers 361 and 362, which make a pair, are formed into a columnar shape, and are arranged through a predetermined gap. Each of the delivery roller units 360 sandwiches, into the gap, one continuous separator material S conveyed from a separator roll (not shown). Then, the delivery roller unit 360 rotates, and thereby sends out the separator material S to the separator conveying device 300. Meanwhile, the delivery roller unit 360 stops, and thereby stops such delivery and restricts the separator material S. The delivery rollers 361 and 362 are controlled by the control device 500, and send out the separator material S to the separator conveying device 300 at predetermined timing.

The cutting units 350 include the separator cutters 351 individually above and below the separator conveying device 300. The separator cutters 351 are heat cutters, which fuse the separator material S sucked onto the outer circumferential surfaces 311 of the stacking drums 310 and 320, and cut the fused separator material S into a predetermined shape. Specifically, first, the separators 40 are sucked onto and conveyed by the outer circumferential surfaces 311 of the stacking drums 310 and 320. In this event, when the recessed portions 313 of the stacking drums 310 and 320 move to positions opposite to the separator cutters 351, the separator cutters 351 move so as to enter the recessed portions 313 of the stacking drums 310 and 320 upon receiving an instruction of the control device 500. In such a way, the separator cutters 351 fuse the separators 40, and cut out the separators 40 into such a predetermined shape as shown in FIG. 3A. In the event of continuously cutting out the separators 40 from the separator material S, a rear end of the separator 40 cut out first is defined as the side 44B on which the engagement portion 43 is formed, and a front end of the separator 40 cut out next is defined as the side 44A. As described above, the two sides 44A and 44B which do not coincide in shape with each other are simultaneously cut out by each of the cutting units 350, whereby the surplus cut pieces S' are generated.

As shown in FIG. 15, the cut piece suction units 370 include cutter-oriented suction heads 371 which exert the suction force. Then, at timing when the separator cutters 351 come off and are retreated from the recessed portions 313 after cutting the separator material S, the cutter-oriented suction heads 371 move so as to come close to regions thus cut. Thereafter, the cutter-oriented suction heads 371 suck and hold the surplus cut pieces S' of the separators 40 cut out by the separator cutters 351. Then, while keeping on sucking and holding the cut pieces S', the cutter-oriented suction heads 371 are spaced apart from the outer circumferential surfaces 311 of the stacking drums 310 and 320. Thereafter, the suction by the cutter-oriented suction heads 371 is stopped to thereby release the cut pieces S', and the cut pieces S' are sucked and collected by suction inlets 372 provided at positions spaced apart from the outer circumferential surfaces 311 of the stacking drums 310 and 320, the suction inlets 372 being provided separately from the stacking drums 310 and 320.

Here, if the cut pieces S' are attempted to be collected only by the suction inlets 372 without using the cutter-oriented suction heads 371, then there is an apprehension that, in such a suction process, the cut pieces S' may be brought into contact with the separators 40 and the separator material S, which are left on the outer circumferential surfaces 311. However, the cut pieces S' are collected by the suction inlets 372 after being temporarily sucked and separated from the outer circumferential surfaces 311 by the cutter-oriented suction heads 371, and can be thereby collected while suppressing damage to the separators 40 and the separator material S by the cut pieces S'.

As shown in FIG. 10, in the insides of the respective stacking drums 310 and 320, the inside structure portions 330 are provided. In each of the inside structure portions 330, there are non-rotatably formed: a first negative pressure chamber 331 capable of adjusting strength of a negative pressure in response to the process at the time when the device operates; and a second negative pressure chamber 332 in which the negative pressure is kept substantially constant at the time when the device operates. The first negative pressure chamber 331 and the second negative pressure chamber 332 are connected to a negative pressure supply device 333 provided with a pressure regulating valve, and are capable of adjusting internal pressures thereof in such a manner that the negative pressure supply device 333 is controlled by the control device 500.

The first negative pressure chamber 331 and the second negative pressure chamber 332 are isolated from the outside by an inner circumferential surface of each of the stacking drums 310 and 320. Hence, on the outer circumferential surfaces 311 of the stacking drums 310 and 320, regions of the negative pressure are generated in such a non-rotatable manner through the air vent holes 312 formed in the stacking drums 310 and 320. These regions do not rotate even if the stacking drums 310 and 320 rotate. Such first negative pressure chambers 331 are formed in ranges from positions, which correspond to the delivery roller units 360, toward the rotation directions of the stacking drums 310 and 320 to positions corresponding to the separator cutters 351. Such second negative pressure chambers 332 are formed in ranges of substantially 180 degrees from positions, which correspond to the separator cutters 351, toward the rotation directions of the stacking drums 310 and 320 to positions corresponding to the gap 340.

Figure 11:
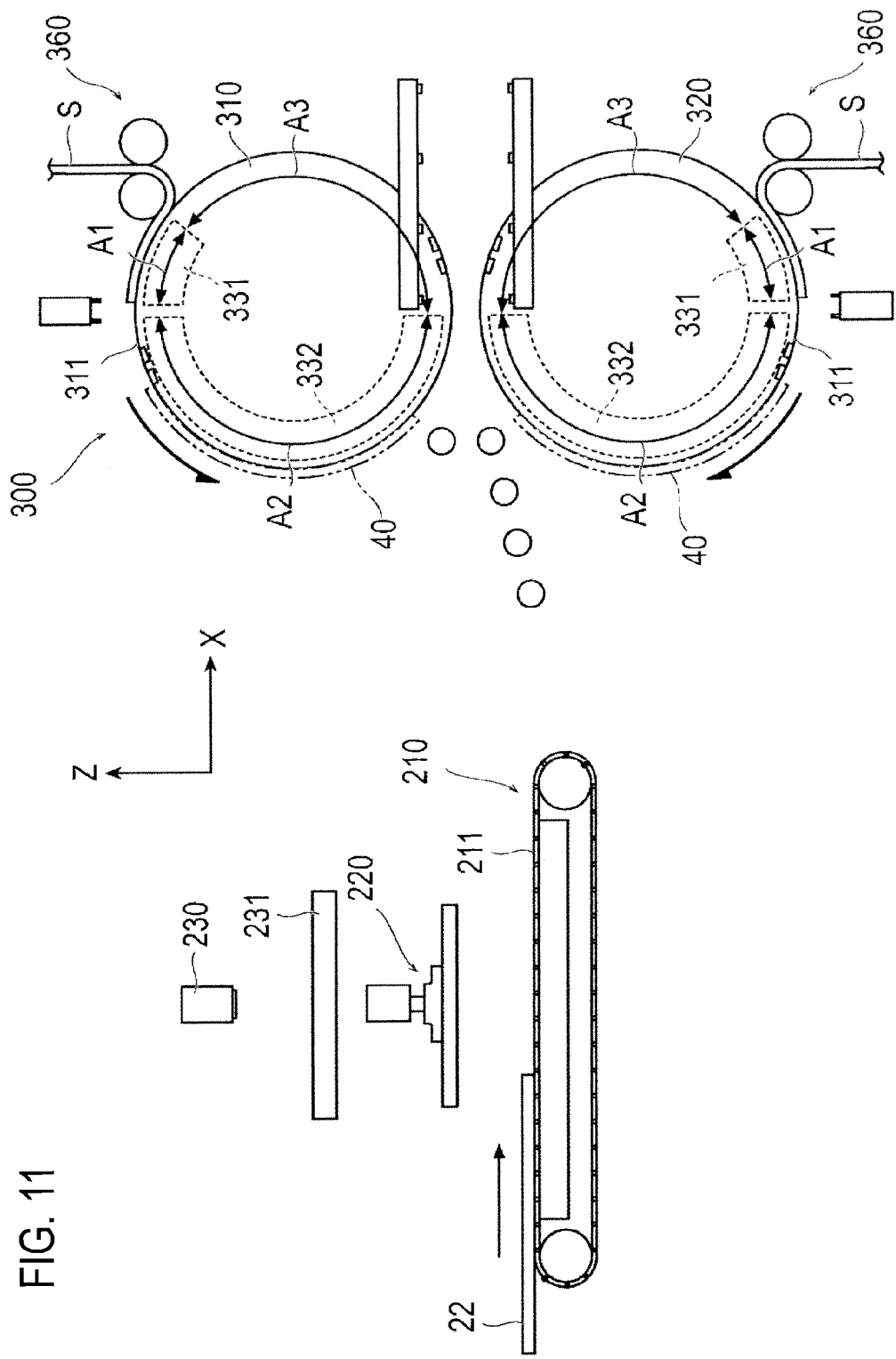
FIG. 11 is a first explanatory view showing a process by the stacking device including the separator conveying device.

Hence, as shown in FIG. 11, on the outer circumferential surfaces 311 of the stacking drums 310 and 320, slip regions A1 (suction force adjustment regions), in which the negative pressures are adjusted and changed at positions corresponding to the first negative pressure chambers 331, are formed. Moreover, on the outer circumferential surfaces 311, suction regions A2, in which the negative pressures are substantially constant and the separator material S or the cut out separators 40 are sucked and held at positions corresponding to the second negative pressure chambers 332, are formed. The suction regions A2 have strong suction force, can hold the separator material S or the cut out separators 40 by the suction force, and can rotate these along the rotations of the stacking drums 310 and 320. The slip regions A1 can also set therein suction force equivalent to that of the suction regions A2, and can rotate the separators 40. Moreover, while holding the separator material S to an extent where the separator material S concerned is not separated from the outer circumferential surfaces 311, the slip regions A1 lowers the suction force thereof, and can thereby slip the separator material S on the outer circumferential surfaces 311 without rotating the same separator material S in the event where the stacking drums 310 and 320 rotate.

Moreover, in the inside structure portions 330, in ranges thereof from the positions, which correspond to the gap 340, toward the rotation directions of the stacking drums 310 and 320 to the positions corresponding to the delivery roller units 360, either the first negative pressure chambers 331 or the second negative pressure chambers 332 is not provided. Therefore, in regions of the outer circumferential surfaces 311, which correspond to these ranges, non-suction regions A3, which do not suck the separators 40 without generating the negative pressures therein, are non-rotatably formed.

Then, by the stacking drums 310 and 320, the separator conveying device 300 sucks and conveys the separators 40 while cutting out the same separators 40. Then, while synchronizing a rotation speed of the stacking drums 310 and 320 and a conveying speed of the positive electrode 22 by the electrode conveying unit 200 with each other, the separator conveying device 300 sequentially stacks the separators 40 on both sides of the positive electrode 22 from the downstream side in the conveying direction X. At this time, as shown in FIG. 10, the positive electrode 22 is introduced in a tangential direction T of the columnar stacking drums 310 and 320 by the suction conveying unit 220.

The fusing unit 400 is a unit that fuses both edges of the separators 40, which are stacked on both surfaces of the positive electrode 22, as shown in FIG. 3A. As shown in FIG. 10, this fusing unit 400 includes a pair of upper and lower fusing machines 410 and 420 on both ends of the stacking drums 310 and 320 in the rotation axis direction.

On the upper and lower fusing machines 410 and 420, on surfaces thereof opposite to each other, a plurality of protrusions 411 and 421 are provided along the conveying direction X. Then, the separators 40 are pressurized and heated by the protrusions 411 and 421 opposite to each other, whereby it is made possible to fuse the separators 40 to each other.

The fusing machines 410 and 420 can move in the conveying direction X and the vertical direction Z. That is to say, the fusing machines 410 and 420 come close to each other while moving in the conveying direction X at the same speed as that of the separators 40 so as to synchronize with the separators 40 and the positive electrode 22, which are conveyed to the gap 340 and are stacked on one another there. Then, by the protrusions 411 and 421 opposite to each other, the stacked separators 40 are joined to each other, whereby the joint portions 42 are formed. Thereafter, when the positive electrode 22 packaged in a bag made of the separators 40 is conveyed to a predetermined position, the fusing machines 410 and 420 are spaced apart therefrom, and move to the upstream side in the conveying direction. Then, one more time, the fusing machines 410 and 420 come close to each other while moving in the conveying direction X at the same speed as that of the separators 40, and fuse other joint portions 42. After all of the joint portions 42 are joined to each other, the fusing machines 410 and 420 are spaced apart from each other, and the packaged positive electrode 20 thus fabricated is released.

Note that such mutual joining of the separators 40 is not limited to the above-mentioned structure. That is to say, for example, it is also possible to fuse the separators 40 to each other while heating the separators 40 between a pair of heating rollers which are rotating, to crimp the separators 40 only by pressurization without heating, or to join the separators 40 to each other by using an adhesive.

As shown in FIG. 6, the control device 500 centralizes all of the positive electrode cutting unit 100, the imaging camera 230, the pressing unit 240, the conveyor 210, the suction conveying unit 220, the introduction support unit 250, the delivery roller units 360, the stacking drums 310 and 320, the cutting units 350, the cut piece suction units 370, the negative pressure supply device 333 and the fusing unit 400, and integrally controls all of them. Then, the control device 500 can operate the respective units of FIG. 6 while synchronizing the units concerned with one another. Note that the control device 500 can also control other devices for fabricating the battery together with the above-described units in a centralized manner.

Next, while referring to FIG. 11 to FIG. 19, a description is made of a stacking method using this stacking device.

First, the sheet material D for the positive electrode, which is wound up in the roll shape, is cut by the positive electrode cutting unit 100, and the positive electrode 22 is formed. The positive electrode 22 thus cut out is placed on the installation surface 215 of the conveyor 210 by an unillustrated suction pad, conveyor or the like. Moreover, each of the delivery roller units 360 sandwiches and restricts, into the gap, one continuous separator material S sent from the separator roll. Hence, as shown in FIG. 11, a tip end of the separator material S is located on an uppermost portion or lowermost portion of the separator conveying device 300. Then, in each of the first negative pressure chambers 331, the negative pressure is set low, and the separator material S is not drawn out on the slip region A1 of the outer circumferential surface 311, but the stacking drum 310 or 320 rotates while slipping on the inner surface of the separator material S. Note that, in this embodiment, two separators 40 are cut out during one rotation of the stacking drum 310 or 320, and accordingly, as shown by each chain double-dashed line in FIG. 11, the separator 40 cut out previously is already sucked and conveyed onto the outer circumferential surface 311 of the stacking drum 310 or 320.

Figure 12:
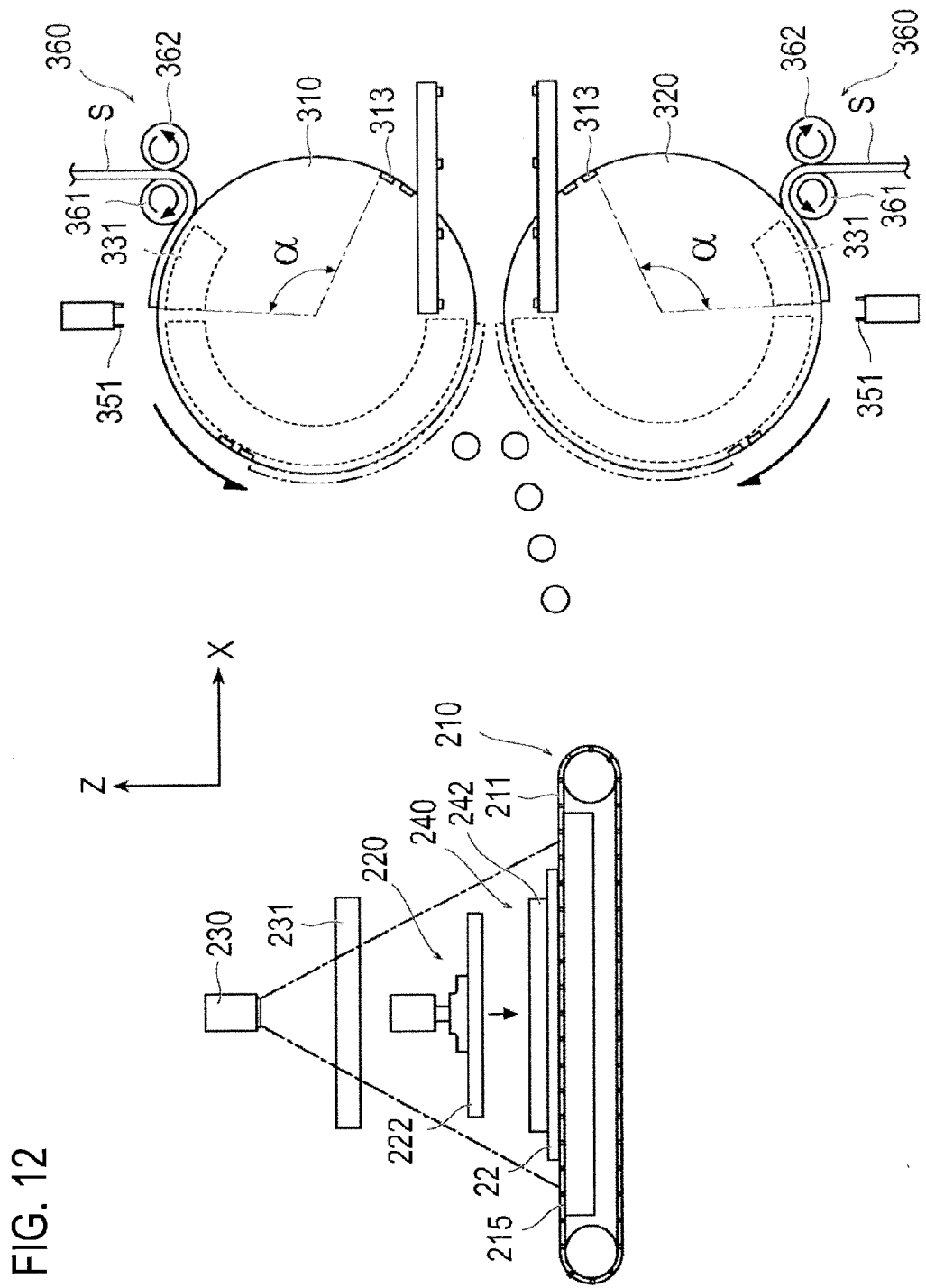
FIG. 12 is a second explanatory view showing the process by the stacking device including the separator conveying device.

As shown in FIG. 11, the conveyor 210 on which the positive electrode 22 is placed conveys the positive electrode 22, which is located on the installation surface 215 of the suction belt 211, in tandem (array in which the tab is located on the upstream side in the conveying direction X) in line in the conveying direction X. In this event, the positive electrode 22 is sucked by the suction belt 211, and accordingly, an occurrence of a curling-up phenomenon or the like is suppressed. Note that the positive electrode 22 may be conveyed in parallel (array in which the tab is located in the width direction Y). When the suction belt 211 moves to a predetermined position, stops the movement thereof while keeping a state of sucking the positive electrode 22. Then, as shown in FIG. 12, the pressing unit 240 is actuated, and presses the long regions, which go along the two sides H2 and H4 of the positive electrode 22, by the dampers 242 (refer to FIG. 8 and FIG. 9). In such a way, the deformation such as curling of the positive electrode 22 is corrected. Then, a portion of the positive electrode 22, which has floated from the suction belt 211, approaches the suction belt 211, and is thereby sucked by the suction belt 211, and the positive electrode 22 will be tightly attached onto the installation surface 215.

In this state, the imaging camera 230 images the four sides H1 to H4 of the positive electrode 22, and transmits the predetermined signal to the control device 500. By the above-mentioned method, from the received signal, the control device 500 calculates the coordinates of the electrode center point O and the inclination angle θ, and calculates the correction amounts of the position and inclination with respect to the regular position of the positive electrode 22. Note that, in the event of such imaging, the dampers 242 press the inside (center side of the positive electrode 22) of the edges of the four sides H1 to H4 of the positive electrode 22, and accordingly, the four sides H1 to H4 can be surely imaged by the imaging camera 230. Moreover, the dampers 242 are formed of a transparent material, and accordingly, even if the clampers 242 enter such an imaging range, the positive electrode 22 can be imaged through the clampers 242.

Next, the suction head 222 of the suction conveying unit 220 located above the suction belt 211 is allowed to go down, and the suction head 222 is thrust against the upper surface of the positive electrode 22. In such a way, the positive electrode 22 is sucked to the suction head 222. Note that the positive electrode 22 is also sucked by the suction belt 211. However, the suction force of the suction head 222 is set higher than that of the suction belt 211, or alternatively, the suction by the suction belt 211 is stopped temporarily, whereby the positive electrode 22 can be separated from the suction belt 211 by the suction head 222.

Then, the stacking drums 310 and 320 rotate, and the recessed portions 313 move toward the positions corresponding to the separator cutters 351. In this event, when the recessed portions 313 take a predetermined angle α to the positions of the separator cutters 351, then by the control device 500, the negative pressures of the first negative pressure chambers 331 are increased, and the suction force of the slip regions A1 is strengthened. Moreover, the delivery roller units 360 are rotated, and the separator material S is sequentially sent out while being sandwiched between the pairs of delivery rollers 361 and 362. In such a way, the supply of the separator material S is started for the stacking drums 310 and 320 (refer to T1 of FIG. 19). Then, in the slip regions A1 in which the negative pressures are increased and in the suction regions A2, the separator material S is sucked onto the outer circumferential surfaces 311 of the stacking drums 310 and 320, and the separator material S is sequentially drawn out following the rotations of the stacking drums 310 and 320. Note that the predetermined angle α is an angle corresponding to the length of one piece of the separators 40 to be cut out.

Figure 13:
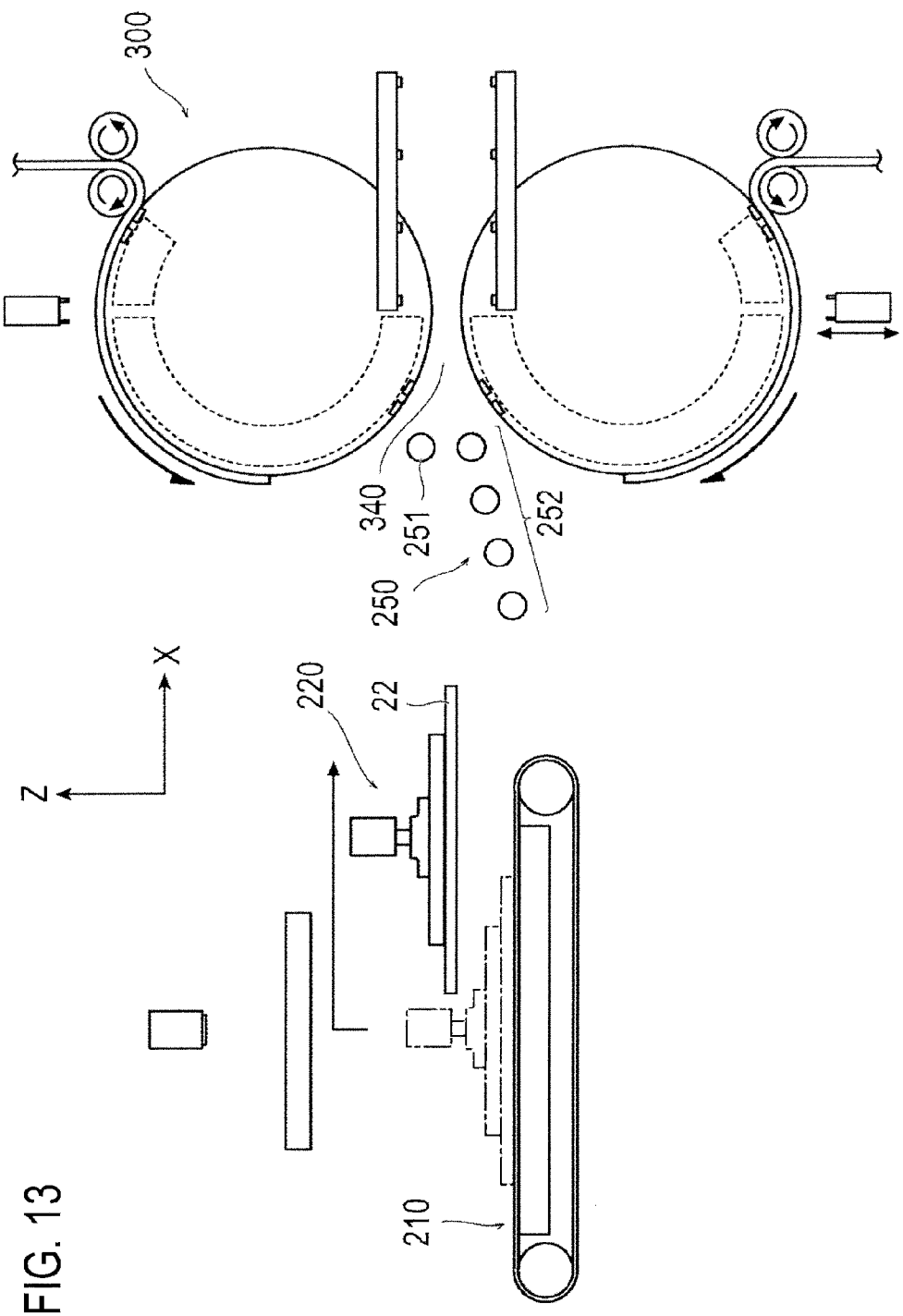
FIG. 13 is a third explanatory view showing the process by the stacking device including the separator conveying device.

Thereafter, as shown in FIG. 13, the suction conveying unit 220 goes up while maintaining the positive electrode 22 in the substantially horizontal state, thereafter, moves in the conveying direction X, and conveys the positive electrode 22 to the gap 340 of the separator conveying device 300. At this time, the suction conveying unit 220 corrects the position and attitude of the positive electrode 22 in such a manner that the drive device thereof is controlled by the control device 500. Specifically, during a period from sucking the positive electrode 22 until delivering the positive electrode 22 to the separator conveying device 300, the suction conveying unit 220 corrects the position and attitude of the positive electrode 22. In such a way, the position of the positive electrode 22 is always maintained with high precision, and the precision of the stacking in the subsequent steps is enhanced.

Then, as shown in FIG. 14, the positive electrode 22 conveyed by the suction conveying unit 220 reaches the introduction support unit 250 in the "opened state", which is provided in front of the gap 340 of the separator conveying device 300. Then, the introduction support unit 250 allows the upper introduction support portion 251 to go down, and sandwiches the tip end of the positive electrode 22 with the lower introduction support portion 252. Moreover, the introduction support unit 250 allows the rollers of the lower introduction support unit 252 to go up, turns to the "closed state" by setting the rollers in the substantially horizontal state, and supports the lower surface of the positive electrode 22. Thereafter, the positive electrode 22 is released from the suction head 222 of the suction conveying unit 220, and the positive electrode 22 is sequentially sent into the gap 340 of the separator conveying device 300 by the rotation of the introduction support unit 250.

Figure 19:
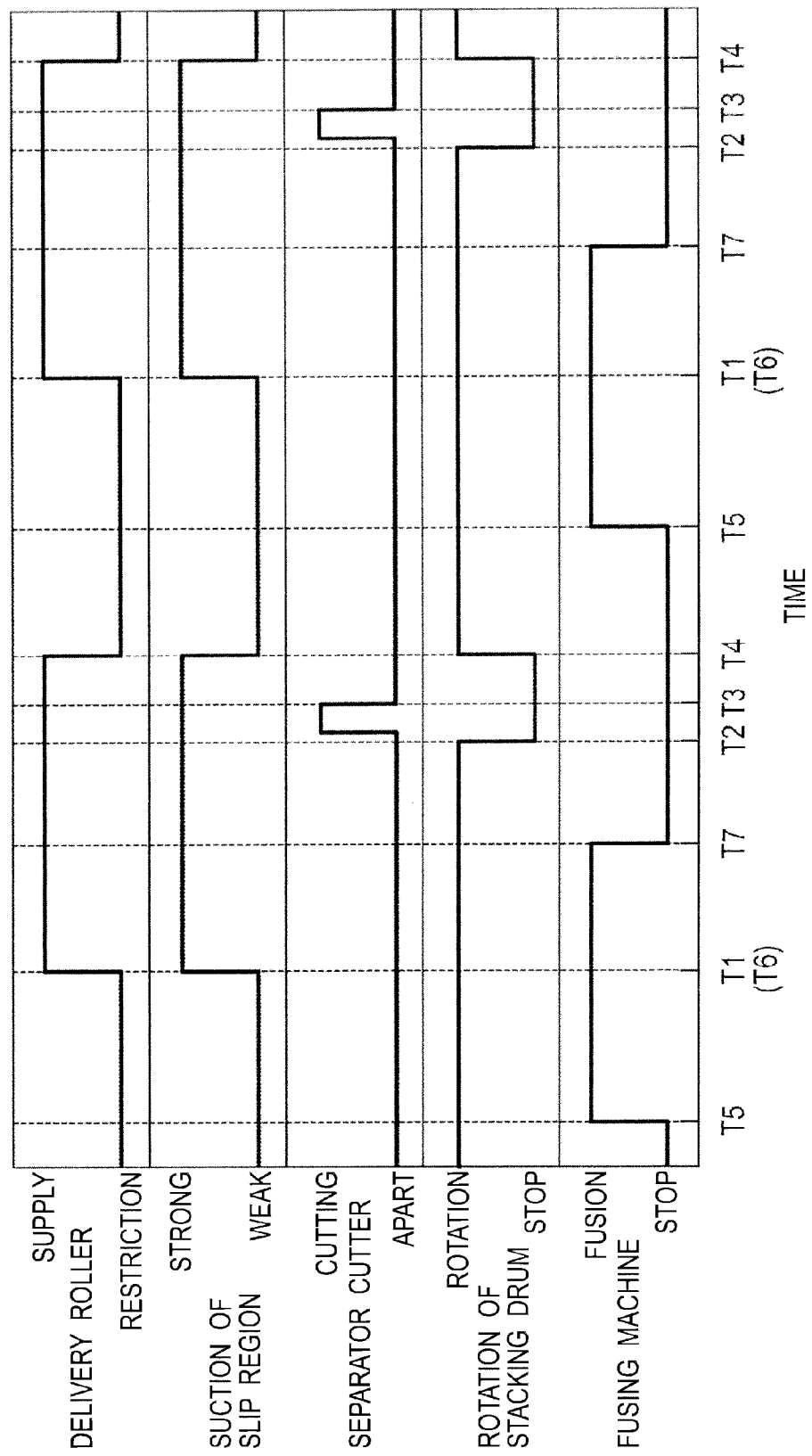
FIG. 19 is a chart showing operations of the separator conveying device.

Moreover, in the separator conveying device 300, when the stacking drums 310 and 320 rotate by the angle α from the start of the rotations, the rotations of the stacking drums 310 and 320 are stopped (refer to T2 of FIG. 19). At this time, the separator material S is drawn out onto the stacking drums 310 and 320 by the angle α corresponding to one piece of the separators 40. Moreover, the recessed portions 313 are located opposite to the separator cutters 351 of the cutting units 350. Then, by the instruction of the control device 500, the separator cutters 351 are thrust against the separator material S, and the separator material S is formed into the predetermined shape, whereby the separators 40 are cut out. The separators 40 thus cut out are located on the suction regions A2 of the stacking drums 310 and 320, which are shown in FIG. 11, and accordingly, are sucked by and held on the stacking drums 310 and 320.

Then, the separator cutters 351 come off and are retreated from the recessed portions 313 after cutting the separator material S. At this timing (refer to T3 of FIG. 19) when the separator cutters 351 are retreated, as shown in FIG. 15, by the instruction of the control device 500, the cutter-oriented suction heads 371 come close to the surplus cut pieces S', suck and hold the same, and thereafter, return to the original positions thereof. Thereafter, the suction by the cutter-oriented suction heads 371 is stopped to thereby release the cut pieces S', and the cut pieces S' are sucked and collected by the suction inlets 372 shown in FIG. 10.

Then, after the positive electrode 22 is released from the suction head 222 of the suction conveying unit 220, the positive electrode 22 is sequentially sent into the gap 340 between the stacking drums 310 and 320 by the rotation of the introduction support unit 250. Moreover, the stacking drums 310 and 320 are rotated one more time (refer to T4 of FIG. 19), and the separators 40 thus cut out are rotated while being left sucked, and are conveyed to the gap 340. Note that, in the event of rotating the stacking drums 310 and 320 one more time, such a state is set, where, by the control device 500, the negative pressures of the first negative pressure chambers 331 are lowered to thereby weaken the suction force of the slip regions A1, and the separator material S is restricted by the delivery roller units 360 (refer to FIG. 18). In such a way, the stacking drums 310 and 320 rotate while slipping on the inner surfaces of the separator material S without allowing the separators 40 to be drawn out on the slip regions A1 of the outer circumferential surfaces 311.

Figure 16:
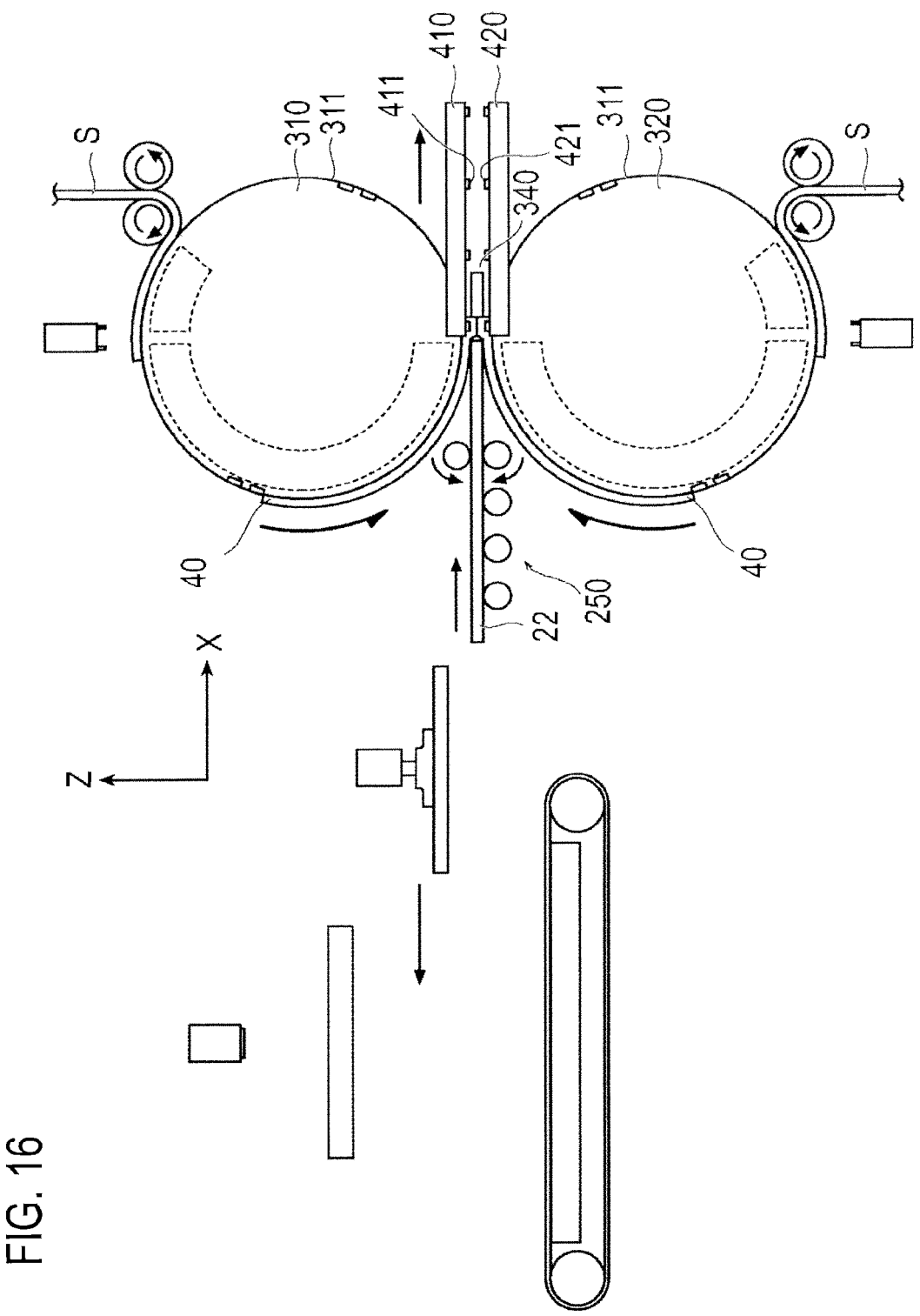
FIG. 16 is a sixth explanatory view showing the process by the stacking device including the separator conveying device.

When the tip ends of the separators 40 reach the gap 340 of the separator conveying device 300, then as shown in FIG. 16, the two separators 40 are first stacked on each other, and thereafter, the separators 40 are stacked on both surfaces of the tip end of the positive electrode 22. At this time, the speed of the separators 40 and the speed of the positive electrode 22 become equal to each other. Moreover, by the control device 500, conveying positions (conveying timing) and conveying speeds of the separators 40 and the positive electrode 22 in the separator conveying device 300 and the suction conveying unit 220 are controlled so that the separators 40 and the positive electrode 22 can be stacked on one another at an appropriate position set in advance.

Next, by the instruction of the control device 500, a pair of the fusing machines 410 and 420 move in the conveying direction X while coming close to each other, and sandwich and crimp only tip ends of both edges of the separators 40. Then, while moving the fusing machines 410 and 420 in the conveying direction X of the separators 40 and the positive electrode 22, the tip ends concerned are fused by the protrusions 411 and 421 (refer to T5 of FIG. 19). After passing through the gap 340, the separators 40 reach the non-suction regions A3 of the stacking drums 310 and 320. Therefore, the separators 40 are separated from the outer circumferential surfaces 311 of the stacking drums 310 and 320 without receiving the suction force, and are sequentially discharged in the conveying direction X in a state of sandwiching the positive electrode 22 therebetween. Then, since the tip ends of the separators 40 are already joined to each other, the separators 40 are not separated from each other even if the separators 40 are separated from the outer circumferential surfaces 311 of the stacking drums 310 and 320.

Also thereafter, in synchronization with the stacking drums 310 and 320, the positive electrode 22 is conveyed in the substantially horizontal state in the conveying direction X by the introduction support unit 250. Then, the separators 40 sucked onto the outer circumferential surfaces 311 of the stacking drums 310 and 320 are sequentially stacked on both surfaces of the positive electrode 22 following the rotations of the stacking drums 310 and 320. Note that, at this time, the suction force of the slip regions A1 is strengthened one more time in order to cut out the next separators 40, and the supply of the separator material S by the delivery roller units 360 is started (refer to T6 of FIG. 19).

Figure 17:
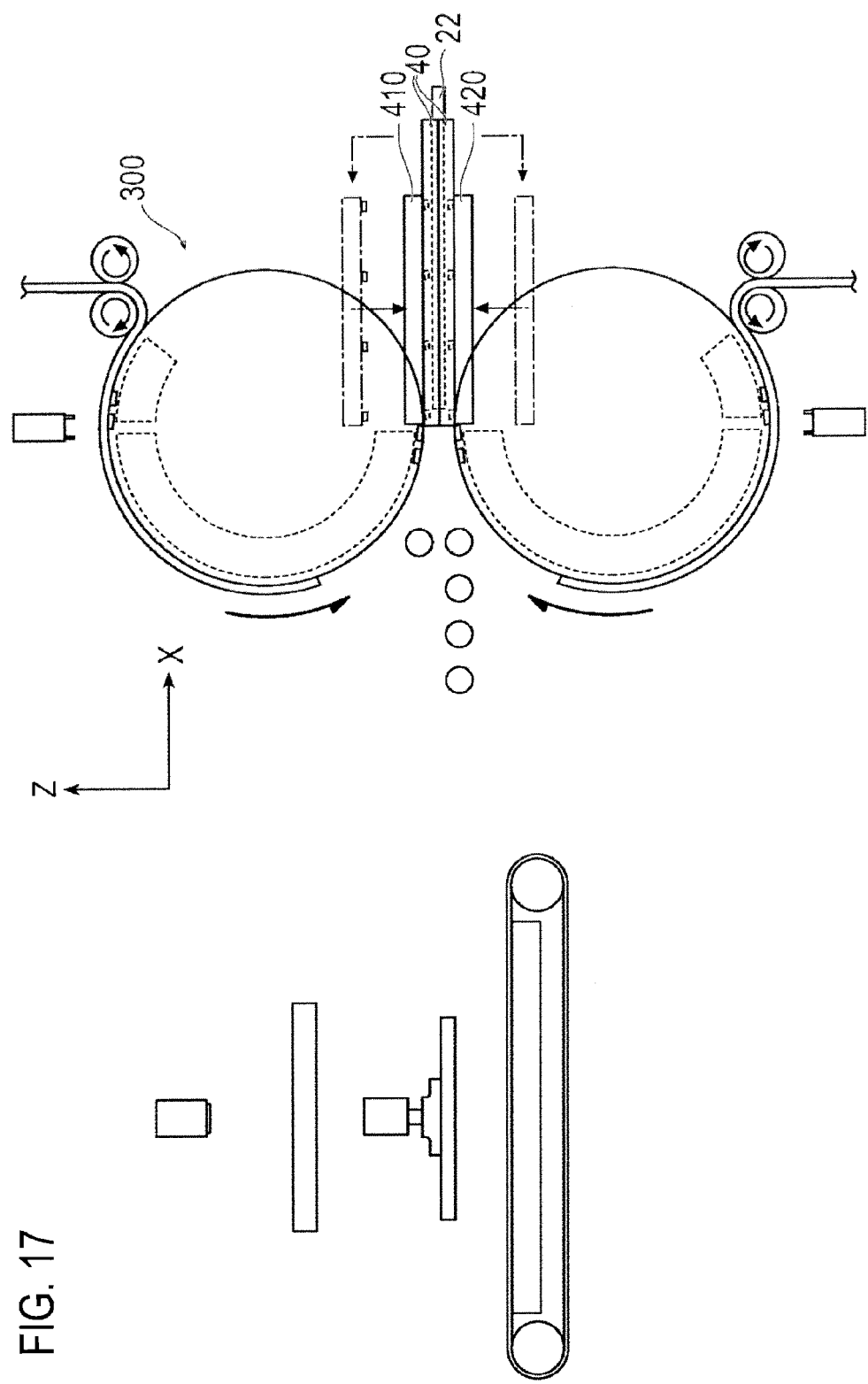
FIG. 17 is a seventh explanatory view showing the process by the stacking device including the separator conveying device.
Figure 18:
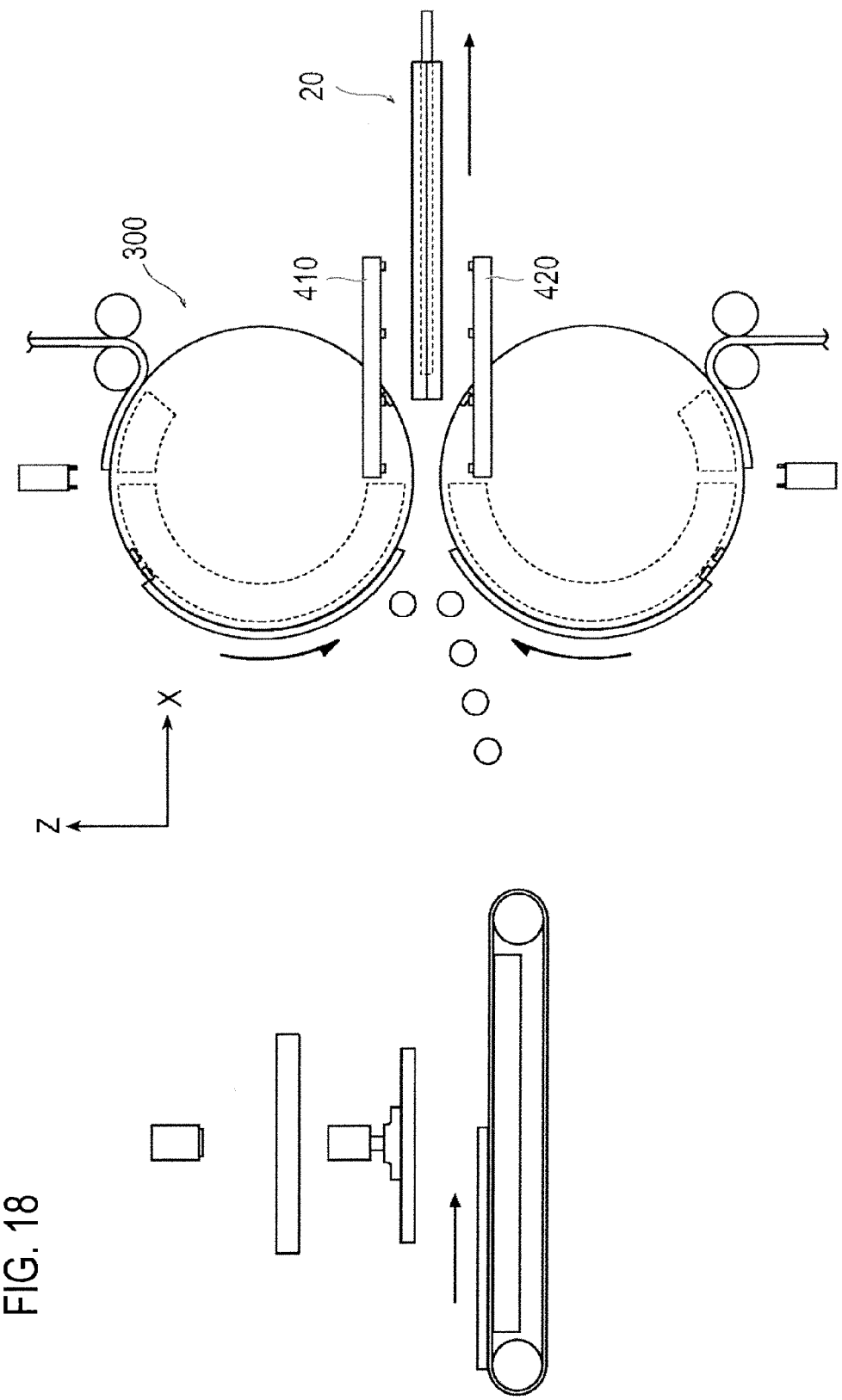
FIG. 18 is an eighth explanatory view showing the process by the stacking device including the separator conveying device.

Then, after the positive electrode 22 is conveyed to the predetermined position in a state where the separators 40 are stacked on both surfaces of the positive electrode 22 concerned, a pair of the fusing machines 410 and 420 are spaced apart from each other, and are moved to the upstream side in the conveying direction. Thereafter, as shown in FIG. 17, the fusing machines 410 and 420 are allowed to come close to each other one more time while being moved in the conveying direction X, and other joint portions 42 are fused. After all of the joint portions 42 on both edges of the separators 40 are joined to each other, as shown in FIG. 18, the fusing machines 410 and 420 are spaced apart from each other, and the packaged positive electrode 20 thus fabricated is released (refer to T7 of FIG. 19). Thereafter, the joint portions 42 of the sides 44B of the separators 40 are also joined to each other by other fusing machines (not shown), and the packaged positive electrode 20 is formed.

Then, such packaged positive electrodes 20 can be continuously fabricated by repeating the above-described steps.

The packaged positive electrodes 20 thus fabricated are conveyed to the next steps, are stacked alternately with the negative electrodes 30 to be then formed into the power generation elements 15, and finally, the lithium ion secondary battery 10 is manufactured.

In accordance with this embodiment, in a state where the separator material S is held on the outer circumferential surfaces 311 of the cylindrical stacking drums 310 and 320, the separators 40 are cut out on the outer circumferential surfaces 311. Therefore, tension acting on the separators 40 at the time when the separators 40 are cut becomes uniform, and a shape of the separators 40 after the separators 40 are cut becomes stable. Moreover, the stacking drums 310 and 320 are rotated while maintaining such a state where the cut out separators 40 are held on the outer circumferential surfaces 311, whereby the separators 40 are conveyed. Therefore, the separators 40 can be conveyed while keeping on maintaining the stable shape of the separators 40 after the separators 40 are cut. Therefore, an occurrence of a wrinkle and the like in the separators 40 can be suppressed in the event of stacking the separators 40 on the positive electrode 22 in the subsequent step.

Moreover, the separator cutters 351, which are capable of coming close to and being spaced apart from the outer circumferential surfaces 311 of the stacking drums 310 and 320, are provided. Moreover, in the outer circumferential surfaces 311, the recessed portions 313 (receiving portions), which receive the separator cutter 351, are provided. Therefore, the separators 40 can be cut out while keeping on holding the separator material S on the outer circumferential surfaces 311, and this brings excellent conveying characteristics. Note that, by the fact that the recessed portions 313 are formed on the outer circumferential surfaces 311, it is regarded that the separator material S is cut on the outer circumferential surfaces 311 even if the separator material S is locally spaced apart from the outer circumferential surfaces 311.

Moreover, there are provided the cut piece suction units 370 which suck the surplus cut pieces S' of the cut separator material S, and accordingly, the unnecessary cut pieces S' can be collected.

Moreover, the control device 500 (synchronization device) is provided, which stops the rotations of the stacking drums 310 and 320 in synchronization with the cutting of the separators 40 by the cutting units 350. Therefore, the rotations of the stacking drums 310 and 320 can be stopped at that cutting timing, and the separators 40 can be cut out with an accurate size.

Moreover, the delivery roller units 360 (locking mechanisms) are provided, which stop the supply of the separator material S to the stacking drums 310 and 320 in synchronization with the stop of the rotations of the stacking drums 310 and 320. Therefore, the separator material S with a necessary length can be supplied in response to the rotations of the stacking drums 310 and 320.

Furthermore, in this embodiment, the cutting units 350 which cut out the separators 40 are provided, and moreover, the suction regions A2 and the slip regions A1 are provided on the outer circumferential surfaces 311. Then, the separator material S is cut between the suction regions A2 and the slip regions A1. Therefore, while sucking and conveying the cut out separators 40 on the suction regions A2, the cut separator material s can be slipped and held on the slip regions A1. Therefore, since the separator material S is left slipped, there can be adjusted timing of increasing the suction force of the slip regions A1 and sucking and drawing out the separator material S one more time for the purpose of cutting out the next separators 40. As a result, it is made possible to smoothly progress the subsequent steps.

Note that the slip regions A1, the suction regions A2 and the non-suction regions A3 do not always have to be non-rotatably formed. That is to say, even if the slip regions A1, the suction regions A2 and the non-suction regions A3 rotate and swing, the slip regions A1, the suction regions A2 and the non-suction regions A3 just need to rotate in a shifted manner from the rotations of the stacking drums 310 and 320 without coinciding therewith. In the case where the slip regions A1, the suction regions A2 and the non-suction regions A3 rotate in the shifted manner, then by the rotations of the stacking drums 310 and 320, the separators 40 on the outer circumferential surfaces 311 can be moved from the slip regions A1 to the suction regions A2, and from the suction regions A2 to the non-suction regions A3.

Moreover, in this embodiment, the separator material S is cut between the slip regions A1 and the suction regions A2. However, as in cutting units 350' shown by chain lines of FIG. 10, the separator material S may be cut between the suction regions A2 and supply positions P at which the separator material S is supplied onto the outer circumferential surfaces 311. In this case, with regard to the separators 40 after being cut, partial portions thereof on the upstream side of the rotations are located on the slip regions A1. However, it is made possible to convey these regions in such a manner that the regions concerned slip on the slip regions A1 and that regions thereof located on the suction regions A2 are sucked.

Moreover, on the slip regions A1, the suction force can be adjusted. Therefore, switching can be made between the case of sucking and fixing the separator material S and drawing out the separator material S concerned onto the outer circumferential surface and the case of slipping the separator material. S while sucking the same. Further, the timing of conveying the separator material S can be adjusted to the optimum.

Moreover, in this embodiment, the delivery roller units 360 (locking mechanisms) are provided, which are capable of stopping the supply of the separator material S to the stacking drums 310 and 320 and slipping the separator material S on the slip regions A1. Therefore, the supply and stop of the separator material S to the outer circumferential surfaces can be switched, and the timing of conveying the separator material s can be adjusted to the optimum.

Note that the present invention is not limited to the above-mentioned embodiment, and is modifiable in various ways.

Figure 20:
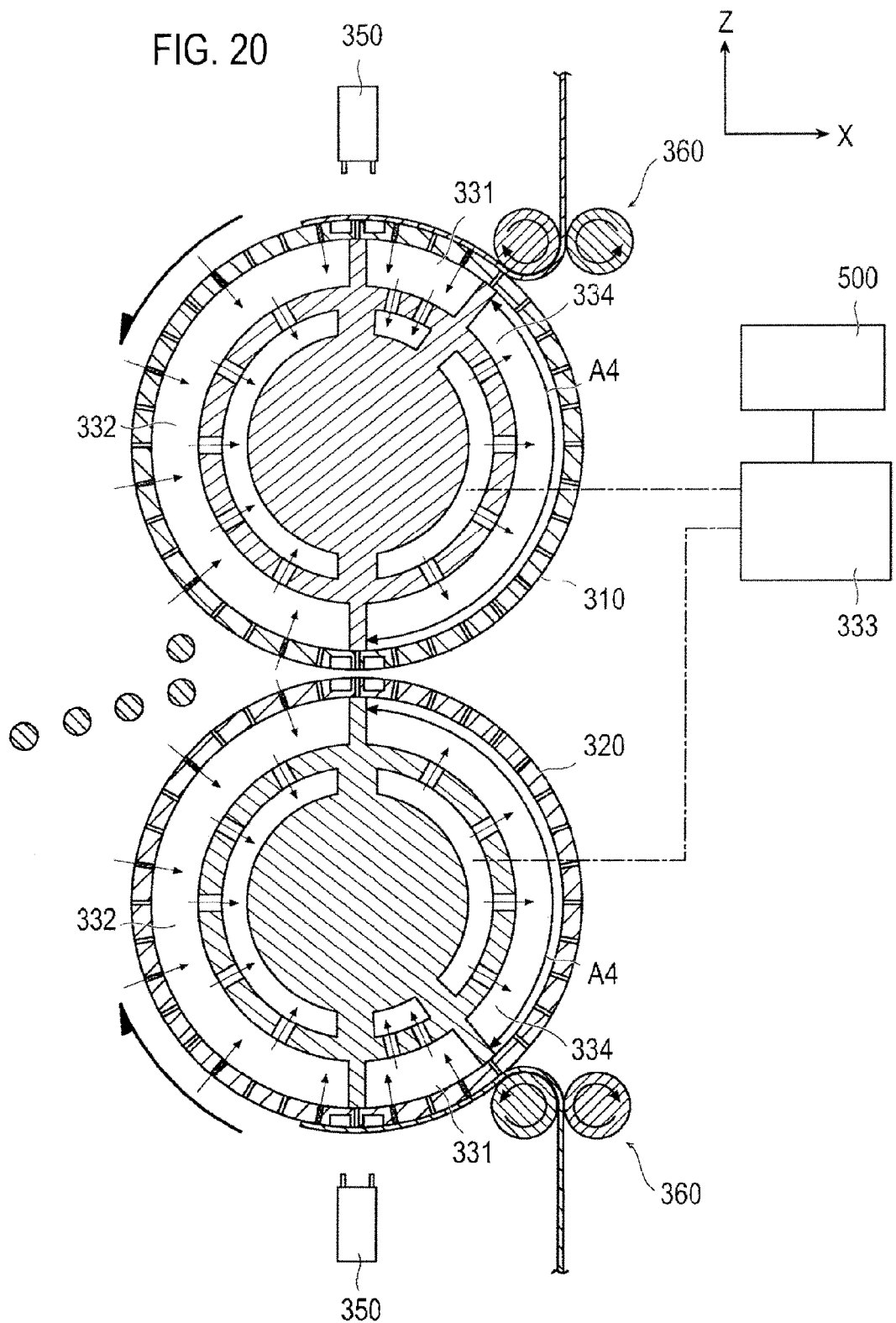
FIG. 20 is a schematic cross-sectional view showing another example of the separator conveying device.

FIG. 20 shows a modification example of such a manufacturing device of the packaged electrode according to this embodiment. As shown in FIG. 20, a configuration can be adopted, in which pressurization chambers 334 higher in pressure than the atmospheric pressure are provided in the insides of the stacking drums 310 and 320 as non-suction regions A4 of the stacking drums 310 and 320, and gas (fluid) is blown out from the air vent holes 312. If such a configuration is adopted, then at timing when the separators 40 are desired to be spaced apart from the stacking drums 310 and 320, the separators 40 can be spaced apart therefrom while application of loads thereto is being avoided as much as possible.

Figure 21:
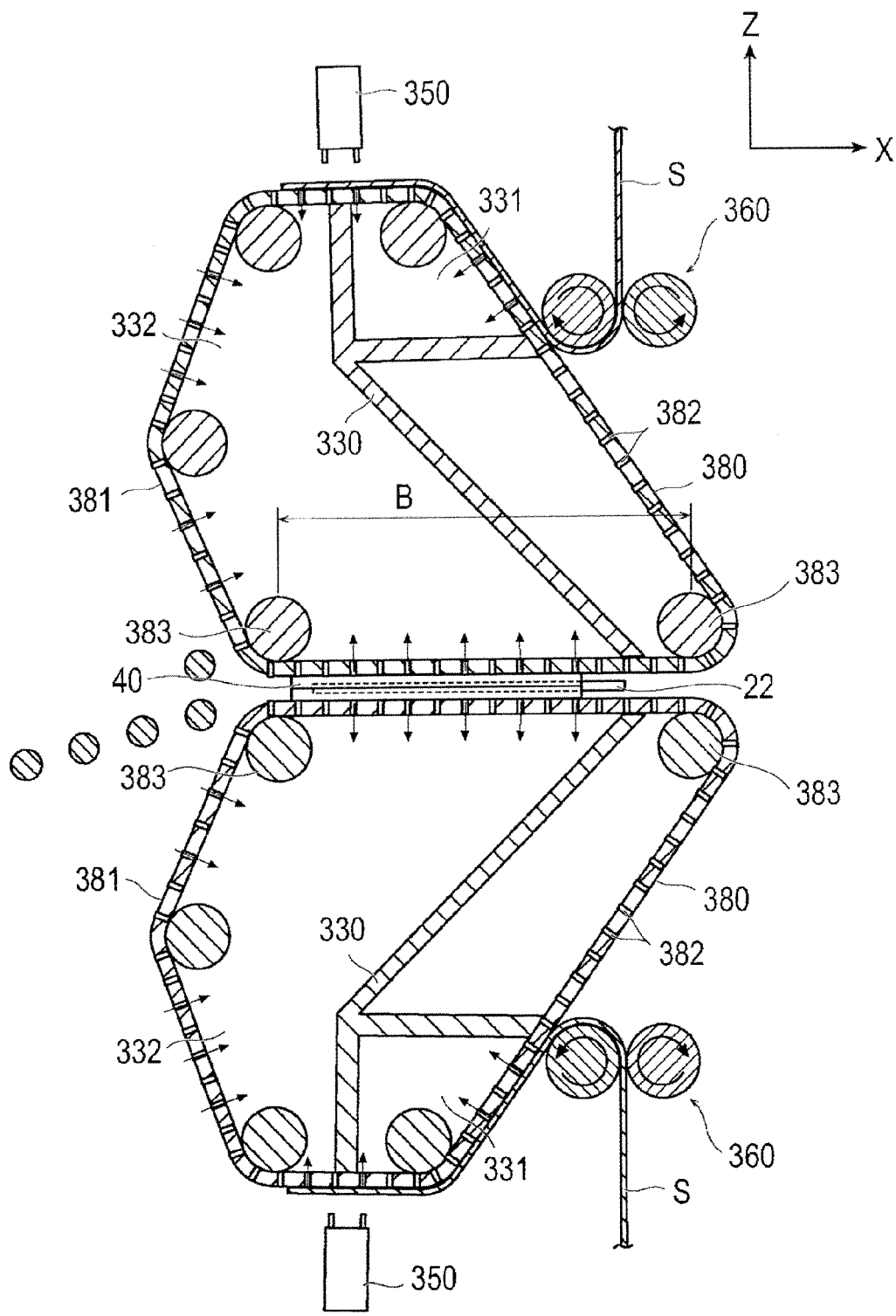
FIG. 21 is a schematic cross-sectional view showing still another example of the separator conveying device.

Moreover, FIG. 21 shows another modification example of the manufacturing device of the packaged electrode according to this embodiment. As shown in FIG. 21, the stacking drums do not have to be columnar, and suction belts 380 which are flexibly bendable and have air vent holes 382 may be held by pluralities of rotation rollers 383. With such a configuration, a cross section of the stacking device is not limited to the circular shape, and outer circumferential surfaces 381 can be formed into an arbitrary shape, and a degree of freedom in design is enhanced. In particular, with such a configuration, between the suction belts 380 which make a pair, a region B in which the separators 40 and the positive electrode 22 are stacked on each other can be set wide. In such a way, the separators 40 and the positive electrode 22 can be sandwiched and held by the suction belts 380 until the fusing by the fusing machines is completed, and precision of the fusing can be enhanced. Note that, in FIG. 20 and FIG. 21, the same reference numerals are used for regions having similar functions to those of this embodiment, and a description thereof is omitted.

Moreover, in the above-described embodiment, as the packaged positive electrode 20, the mode in which the positive electrode 22 is packaged in the separators 40 is described. However, it may be the negative electrode 30 that is packaged by the above-described manufacturing device of the packaged electrode.

Moreover, in the above-described embodiment, the description is made of the case where, as shown in FIG. 1, the positive electrode lead 11 and the negative electrode lead 12 are taken out from the same end portion of the covering material 13; however, arrangement of the leads is not limited to this. The positive electrode lead 11 and the negative electrode lead 12 may be taken out, for example, from end portions opposite with each other. In this case, in the event of forming the power generation element 15 of the lithium ion secondary battery 10, the negative electrode 30 and the packaged positive electrode 20 are stacked on each other so that the positive electrode tab 23 and the negative electrode tab 33 can be directed in reverse directions to each other.

Moreover, in this embodiment, the predetermined gap 340 is provided between the pair of upper and lower stacking drums 310 and 320 in the separator conveying device 300. However, such a state can also be allowed, where the stacking drums 310 and 320 are in contact with each other and do not have any gap therebetween. In this case, preferably, one or both of the stacking drums 310 and 320 have a structure of following the positive electrode 22 and the separators 40 in response to thicknesses thereof.

Moreover, in the electrode conveying unit 200, the positive electrode 22 is conveyed in the substantially horizontal state; however, may be conveyed in other directions.

Furthermore, the pair of stacking drums 310 and 320 are not arranged vertically, but may be arranged in other directions.

Moreover, in this embodiment, by the separator cutters 351, the one continuous separator material S is cut out into a predetermined shape in a state of being sucked onto the outer circumferential surfaces 311 of the stacking drums 310 and 320. However, the separators 40 cut out into the predetermined shape in advance may be supplied to the stacking drums 310 and 320, and may be conveyed while being sucked thereto.

Moreover, in this embodiment, the pair of stacking drums 310 and 320 with symmetric shapes are provided. However, the shapes of the stacking drums (separator conveying units) which make a pair may be asymmetric, and for example, one thereof may be formed as such a columnar stacking drum, and other thereof may be formed as a suction belt with an arbitrary shape.

Moreover, the stacking drums 310 and 320 have the suction force, and accordingly, in such a configuration of stacking one piece of the separators 40 on one surface of the positive electrode 20 (or the negative electrode 30), one stacking drum is enough to sufficiently exert the function of the device.

Moreover, the introduction support unit 250 is composed entirely of the rollers; however, may be composed of other members such as flat members.

Moreover, the cutting blades provided on the cutting units 350 do not have to be the heat cutters, but may be physically sharp cutting blades. Furthermore, the recessed portions 313 are provided as the receiving portions; however, the receiving portions do not always have to be the recessed portions 313.

Moreover, in the slip regions A1 of the stacking drums 310 and 320, the negative pressures are adjusted, whereby the slip and suction of the separator material S on the outer circumferential surfaces 311 are adjusted. However, in a state where the negative pressures of the first negative pressure chambers 331 are kept substantially constant, the supply and restriction of the separator material S may be adjusted only by restriction force of the delivery roller units 360. Note that, in this event, preferably, the suction force of the slip regions A1 is lower than the suction force of the suction regions A2.

Moreover, a method of giving the suction force to the stacking drums 310 and 320 (separator conveying units) is not limited to such a suction method using the negative pressures, and for example, a suction method using static electricity may be used.

Moreover, in this embodiment, the positive electrode cutting unit 100, the imaging camera 230, the pressing unit 240, the conveyor 210, the suction conveying unit 220, the introduction support unit 250, the delivery roller units 360, the stacking drums 310 and 320, the cutting units 350, the cut piece suction units 370, the negative pressure supply device 333 and the fusing unit 400 are synchronized with one another by the control device 500 (synchronization device). However, it is not always necessary that all of the above-described units be electrically synchronized with one another, and for example, at least a part thereof may be mechanically linked and synchronized with one another.

The entire contents of Japanese Patent Application No. 2011-085738 (filed on Apr. 7, 2011) and Japanese Patent Application No. 2011-085745 (filed on Apr. 7, 2012) are incorporated herein by reference.

The description has been made above of the contents of the present invention along the embodiment; however, it is self-obvious for those skilled in the art that the present invention is not limited to the description of these, and that varieties of modifications and improvements are possible.

INDUSTRIAL APPLICABILITY

In accordance with the separator conveying device and separator conveying method of the present invention, the separators are cut out on the outer circumferential surfaces of the columnar rotors, and accordingly, the tension acting on the separators at the time when the separators are cut becomes uniform, and the shape of the separators after the separators are cut becomes stable. Moreover, the columnar rotors are rotated while maintaining the state where the cut out separators are held on the outer circumferential surfaces, whereby the separators are conveyed. Therefore, the separators can be conveyed while keeping on maintaining the stable shape of the separators after the separators are cut. Therefore, for example, the occurrence of the wrinkle and the like in the separators can be suppressed in the event of stacking the separators on the electrode in the subsequent step, and it is made possible to enhance the processing precision in the subsequent steps.

Moreover, in the present invention, the cutting units which cut out the separators are provided. Furthermore, with respect to the outer circumferential surfaces of the columnar rotors, the slip regions are defined more on the supply position side of the separators than the suction regions thereof. Then, the separator material is cut between the suction regions and the supply positions. Therefore, at the same time when the separators after being cut are sucked and conveyed on the suction regions, the timing of drawing out the separator material one more time can be adjusted arbitrarily while slipping the separator material. Therefore, it is made possible to smoothly progress the processing.

REFERENCE SIGNS LIST

40 SEPARATOR
300 SEPARATOR CONVEYING DEVICE
310, 320 STACKING DRUM (COLUMNAR ROTOR)
311 OUTER CIRCUMFERENTIAL SURFACE
313 RECESSED PORTION (RECEIVING PORTION)
350 CUTTING UNIT
360 DELIVERY ROLLER UNIT (LOCKING MECHANISM)
370 CUT PIECE SUCTION UNIT
500 CONTROL DEVICE (SYNCHRONIZATION DEVICE)
S SEPARATOR MATERIAL
S' CUT PIECE

The invention claimed is:

1. A separator conveying device comprising:
a columnar rotor that holds a separator material on an outer circumferential surface thereof, the separator material being continuously supplied thereto;
a cutting unit that cuts the separator material in a state where the separator material is held on the outer circumferential surface of the columnar rotor, and cuts out a separator with a predetermined shape; and
a control unit configured to control a suction force in a slip region, wherein
the separator cut out by the cutting unit is conveyed by rotating the columnar rotor while maintaining a state where the separator is held on the outer circumferential surface of the columnar rotor,
the outer circumferential surface of the columnar rotor is formed into a suction region where the separator material or the separator is sucked, and into the slip region where the suction force in the slip region is configured to be switched between a case of sucking and fixing the separator material and a case of slipping the separator material while sucking the separator material, the slip region being located more on a supply position side at which the separator material is supplied onto the outer circumferential surface than the suction region,
the outer circumferential surface rotates relatively to the suction region and the slip region,
the separator material is cut by the cutting unit between the suction region and the supply position,
the cut out separator is sucked and conveyed on the suction region on the outer circumferential surface, the control unit controls the suction force in the slip region to be lower than a suction force in the suction region when the cut out separator is conveyed, thereby the cut separator material is slipped on the slip region with respect to the outer circumferential surface, and the supply of the separator material to the columnar rotor is stopped, and the control unit controls the suction force in the slip region to be equivalent to the suction force of the suction region when a rotation angle of the columnar rotor is a predetermined angle, thereby the supply of the separator material to the columnar rotor is started.

2. The separator conveying device according to claim 1, wherein the cutting unit comprises a cutting blade that comes close to and is spaced apart from the outer circumferential surface of the columnar rotor, and the columnar rotor comprises a receiving portion that receives the cutting blade.

3. The separator conveying device according to claim 1, further comprising:

a cut piece suction unit that sucks a surplus cut piece of the separator material cut by the cutting unit.

4. The separator conveying device according to claim 1, further comprising:

a synchronization device that stops the rotation of the columnar rotor in synchronization with the cutting by the cutting unit.

5. The separator conveying device according to claim 4, further comprising:

a locking mechanism that stops the supply of the separator material to the columnar rotor in synchronization with the stop of the rotation of the columnar rotor.

6. The separator conveying device according to claim 1, wherein the control unit controls the suction force in the slip region, in order to switch between a state of sucking and fixing the separator or the separator material to the outer circumferential surface and a state of slipping the separator or the separator material while sucking the separator or the separator material.

7. The separator conveying device according to claim 1, further comprising:

a locking mechanism that stops the supply of the separator material to the columnar rotor, and slips the separator material on the slip region, by restricting the separator material.

8. A separator conveying method comprising:

holding a separator material on an outer circumferential surface of a columnar rotor, the separator material being continuously supplied thereto;

cutting out a separator with a predetermined shape by cutting the separator material in a state where the separator material is held on the outer circumferential surface of the columnar rotor; and conveying the cut out separator by rotating the columnar rotor while maintaining a state where the separator is held on the outer circumferential surface of the columnar rotor, wherein the outer circumferential surface of the columnar rotor is formed into a suction region where the separator material or the separator is sucked, and into a slip region where a suction force in the slip region is switched between a case of sucking and fixing the separator material and a case of slipping the separator material while sucking the separator material, a slip region being located more on a supply position side at which the separator material is supplied onto the outer circumferential surface than the suction region, the outer circumferential surface rotates relatively to the suction region and the slip region, the separator material is cut between the suction region and the supply position in the cutting the separator material, and the separator conveying method further comprises:

controlling a suction force in the slip region to be lower than a suction force in the suction region when the cut out separator is conveyed, thereby the cut separator material is slipped on the slip region with respect to the outer circumferential surface, and the supply of the separator material to the columnar rotor is stopped, and controlling the suction force in the slip region to be equivalent to the suction force of the suction region when a rotation angle of the columnar rotor is a predetermined angle, thereby the supply of the separator material to the columnar rotor is started.

9. The separator conveying method according to claim 8, further comprising:

sucking and collecting a surplus cut piece of the cut separator material.

10. The separator conveying method according to claim 8, further comprising:

stopping the rotation of the columnar rotor in synchronization with the cutting of the separator material.

11. The separator conveying method according to claim 10, further comprising:

stopping the supply of the separator material to the columnar rotor in synchronization with the stop of the rotation of the columnar rotor.

12. A separator conveying device comprising:

a columnar rotor that holds a separator material on an outer circumferential surface thereof, the separator material being continuously supplied thereto;

cutting means for cutting the separator material in a state where the separator material is held on the outer circumferential surface of the columnar rotor, and cuts out a separator with a predetermined shape; and control means configured to control a suction force in a slip region, wherein the separator cut out by the cutting means is conveyed by rotating the columnar rotor while maintaining a state where the separator is held on the outer circumferential surface of the columnar rotor, the outer circumferential surface of the columnar rotor is formed into a suction region where the separator material or the separator is sucked, and into the slip region where the suction force in the slip region is configured to be switched between a case of sucking and fixing the separator material and a case of slipping the separator material while sucking the separator material, the slip region being located more on a supply position side at which the separator material is supplied onto the outer circumferential surface than the suction region, the outer circumferential surface rotates relatively to the suction region and the slip region, the separator material is cut by the cutting means between the suction region and the supply position, the cut out separator is sucked and conveyed on the suction region on the outer circumferential surface, the control means controls the suction force in the slip region to be lower than a suction force in the suction region when the cut out separator is conveyed, thereby the cut separator material is slipped on the slip region with respect to the outer circumferential surface, and the supply of the separator material to the columnar rotor is stopped, and the control means controls the suction force in the slip region to be equivalent to the suction force of the suction region when a rotation angle of the columnar rotor is a predetermined angle, thereby the supply of the separator material to the columnar rotor is started.

* * * * *